US011933446B2

(12) United States Patent
Garcia et al.

(10) Patent No.: US 11,933,446 B2
(45) Date of Patent: Mar. 19, 2024

(54) MODULAR LEAK REPAIR

(71) Applicant: TEAM INDUSTRIAL SERVICES, INC., Sugar Land, TX (US)

(72) Inventors: Adrian Garcia, Sugar Land, TX (US); Adam Thistlethwaite, Sugar Land, TX (US); Matthew Guest, Sugar Land, TX (US); Andrew Campbell, Sugar Land, TX (US); Daniel Chalupsky, Sugar Land, TX (US); Mark Lee Swain, Sugar Land, TX (US); Matthew Yasensky, Sugar Land, TX (US)

(73) Assignee: Team Industrial Services, Inc., Sugar Land, TX (US)

( * ) Notice: Subject to any disclaimer, the term of this patent is extended or adjusted under 35 U.S.C. 154(b) by 291 days.

(21) Appl. No.: 17/427,219

(22) PCT Filed: Feb. 6, 2020

(86) PCT No.: PCT/US2020/017018
§ 371 (c)(1),
(2) Date: Jul. 30, 2021

(87) PCT Pub. No.: WO2020/163599
PCT Pub. Date: Aug. 13, 2020

(65) Prior Publication Data
US 2022/0099231 A1  Mar. 31, 2022

Related U.S. Application Data

(60) Provisional application No. 62/956,518, filed on Jan. 2, 2020, provisional application No. 62/801,725, filed on Feb. 6, 2019.

(51) Int. Cl.
*F16L 55/16* (2006.01)
*F16L 55/175* (2006.01)
*F16L 55/179* (2006.01)

(52) U.S. Cl.
CPC ........... *F16L 55/175* (2013.01); *F16L 55/179* (2013.01)

(58) Field of Classification Search
CPC .............................. F16L 55/175; F16L 55/179
(Continued)

(56) References Cited

U.S. PATENT DOCUMENTS 631,867 A * 8/1899 Beaver .................. F16L 55/172
285/356
2,502,351 A  3/1950 Smith
(Continued)

OTHER PUBLICATIONS

European Search Report in related application EP 20752448 dated Nov. 4, 2022.
(Continued)

*Primary Examiner* — James F Hook
(74) *Attorney, Agent, or Firm* — Patterson + Sheridan, LLP

(57) ABSTRACT

A modular enclosure system and method for repair of one or more leaks in a pipe. The modular enclosure system including a first enclosure portion configured to be disposed in a mated configuration to create a first enclosure around the pipe. Each enclosure includes a first void section configured to enclose a pipe section of the pipe. Sealant grooves extend along enclosure faces of each enclosure to seal the modular enclosure system. Each enclosure includes a sealant control system having a plurality of blocking members and configured to selectively block sealant injected in the sealant grooves. Each of the blocking members are positionable between a blocking position configured to block sealant flow in at least one of the sealant grooves and a non-blocking position.

16 Claims, 22 Drawing Sheets

(58) Field of Classification Search
USPC .................................................. 138/97, 99
See application file for complete search history.

(56) References Cited

U.S. PATENT DOCUMENTS

| | | | | | |
|---|---|---|---|---|---|
| 3,550,638 | A | * | 12/1970 | Smith | .................... F16L 55/175 285/15 |
| 3,770,301 | A | * | 11/1973 | Adams | .................... F16L 23/165 285/294.4 |
| 3,944,260 | A | * | 3/1976 | Petroczky | ............. F16L 55/179 285/179 |
| 3,954,288 | A | * | 5/1976 | Smith | ....................... F16L 1/26 285/373 |
| 4,240,650 | A | * | 12/1980 | Adams | .................... F16L 55/175 285/15 |
| 4,709,729 | A | * | 12/1987 | Harrison | ............... F16L 55/172 228/119 |
| 5,118,139 | A | | 6/1992 | Lott | |
| 6,220,302 | B1 | * | 4/2001 | Nolley | .................. F16L 55/103 139/97 |
| 7,900,655 | B2 | | 3/2011 | Morton et al. | |
| 8,141,592 | B2 | | 3/2012 | Rice | |
| 8,424,925 | B2 | | 4/2013 | Smith | |
| 9,175,799 | B2 | | 11/2015 | Clark et al. | |
| 2006/0065320 | A1 | * | 3/2006 | Borland | ................. F16L 55/175 285/15 |
| 2007/0205004 | A1 | * | 9/2007 | Perkovich | .............. B26D 3/169 138/155 |
| 2011/0192185 | A1 | * | 8/2011 | Ingram | ................. F16L 55/103 138/97 |
| 2012/0199234 | A1 | * | 8/2012 | Clark | .................... F16L 55/172 138/99 |
| 2013/0255816 | A1 | * | 10/2013 | Benson | ................... F16L 57/02 29/402.02 |
| 2019/0154183 | A1 | * | 5/2019 | Speakman | ............ F16L 55/172 |

OTHER PUBLICATIONS

Office Action in related application SA 521422712 dated Oct. 10, 2022.

International Search Report and Written Opinion in related application PCT/US2020/017018 dated May 11, 2020.

* cited by examiner

MODULAR LEAK REPAIR

CROSS-REFERENCE TO RELATED APPLICATIONS

This application is a National Phase filing under 35 U.S.C § 371 of International Application PCT/US2020/017018, filed on Feb. 6, 2020, which claims priority to U.S. Provisional Patent Application Ser. No. 62/801,725, filed Feb. 6, 2019, entitled "MODULAR LEAK REPAIR," and U.S. Provisional Patent Application Ser. No. 62/956,518, filed on Jan. 2, 2020, entitled MODULAR LEAK REPAIR, each of which is incorporated herein by reference in its entirety for all purposes.

FIELD OF INVENTION

In general, the present disclosure relates to the repair and sealing of pipe leaks. More specifically, the present disclosure relates to a modular enclosure system and method for the modular repair and sealing of leaks in pipelines under pressure.

BACKGROUND OF INVENTION

Pipelines often develop leaks along pipe and pipe fitting connections. Leaks can occur in a pipe due to factors such as pipe deterioration over time, impact structural damage, or use in harsh environments. Leaks may occur in different sections of the pipe and sometimes at different times during the life to the pipe. Irrespective of the cause, shutting down the pipeline to enable the repair is extremely costly. Stopping the flow of product through the pipeline for the duration of the repair results in delayed delivery and lost revenue for the pipeline operator.

An enclosure may be used on the pipe to contain the leak or leaks in a pipe section. The enclosure may need to be available prior to the detection of a leak in the pipe so that repair may be timely completed. The axial length of the pipe section needing repair may vary so there may be a problem in having an enclosure available that is of the size needed for the axial length of the pipe section needing repair.

What is needed, therefore, is an improved system and method of pipe repair that does not require shutting down the pipeline and that is modular to allow for repair of pipe sections of different axial lengths.

SUMMARY

This summary is provided to introduce a selection of concepts that are further described below in the detailed description. However, many modifications are possible without materially departing from the teachings of this disclosure. Accordingly, such modifications are intended to be included within the scope of this disclosure as defined in the claims. This summary is not intended to identify key or essential features of the claimed subject matter, nor is it intended to be used as an aid in limited the scope of the claimed subject matter.

An embodiment of the present disclosure provides a modular enclosure system for repair of one or more leaks in a pipe. The modular enclosure system includes a first enclosure portion and a second enclosure portion configured to be disposed in a mated configuration to create a first enclosure around the pipe. The first enclosure includes a first void section configured to enclose a first pipe section of the pipe, a first end section with a first opening configured to accommodate the enclosed pipe and a second end section with a second opening configured to accommodate the pipe, a first hub connected to the first end section and a second hub connected to the second end section, a first sealant groove extending along the void section and a second sealant groove extending along the void section. The first sealant groove and the second sealant groove are configured to extend along opposite sides of the enclosed pipe. The first enclosure further includes a first sealant control system having a plurality of blocking members and configured to selectively block sealant injected in the first enclosure to the first sealant groove and the second sealant groove, each of the plurality of blocking members in the first sealant control system positionable between a blocking position configured to block sealant flow in at least one of the first sealant groove and the second sealant groove and a non-blocking position configured to allow sealant flow in at least one of the first sealant groove and the second sealant groove.

A method for repairing one or more leaks in a pipe using a modular enclosure system for repair of one or more leaks in a pipe. The modular enclosure system including a first enclosure portion and a second enclosure portion configured to be disposed in a mated configuration to create a first enclosure around the pipe. The method including positioning a first enclosure portion and a second enclosure portion around a first pipe section to cover a first pipe section with a first void section of the first enclosure, attaching the first enclosure half and the second enclosure half in the mated configuration, and injecting sealant in the first sealant groove and the second sealant groove.

A modular enclosure system for repair of one or more leaks in a pipe. The modular enclosure system including a first enclosure portion having a first enclosure face and a second enclosure portion have a second enclosure face configured to be disposed in a mated configuration to create a first enclosure around the pipe. The first enclosure including a first void section configured to enclose a first pipe section of the pipe, a first hub connected to the first end section and a second hub configured to connect the first enclosure to a second enclosure, a first sealant groove and a second sealant groove disposed between the enclosure face and the second enclosure face when in the mated configuration. The first enclosure further includes a first sealant control system having a plurality of blocking members and configured to selectively block sealant injected in the first enclosure to the first sealant groove and the second sealant groove. Each of the plurality of blocking members in the first sealant control system are positionable between a blocking position configured to block sealant flow in at least one of the first sealant groove and the second sealant groove and a non-blocking position.

BRIEF DESCRIPTION OF THE FIGURES

Certain embodiments of the disclosure will hereafter be described with reference to the accompanying drawings, wherein like reference numerals denote like elements. It is emphasized that, in accordance with standard practice in the industry, various features are not drawn to scale. In fact, the dimensions of various features may be arbitrarily increased or reduced for clarity of discussion. It should be understood, however, that the accompanying figures illustrate the various implementations described herein and are not meant to limit the scope of various technologies described herein, and.

DETAILED DESCRIPTION

Figure 1:
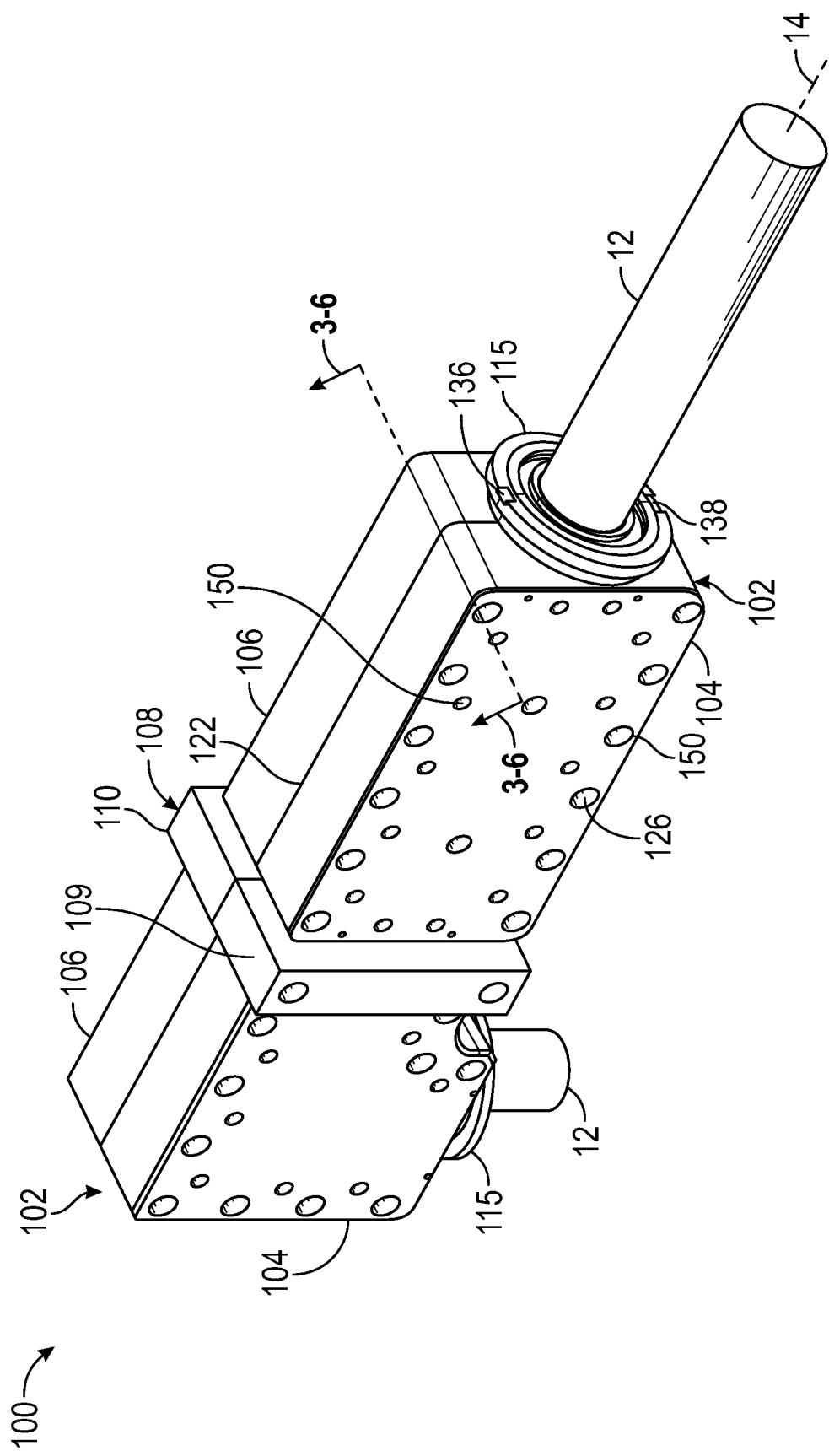
FIG. 1 is a perspective view of a modular enclosure system having a plurality of enclosures connected to one another in accordance with embodiments of the present disclosure.

In the following description, numerous details are set forth to provide an understanding of some embodiments of the present disclosure. It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. However, it will be understood by those of ordinary skill in the art that the system and/or methodology may be practiced without these details and that numerous variations or modifications from the described embodiments are possible. This description is not to be taken in a limiting sense, but rather made merely for the purpose of describing general principles of the implementations. The scope of the described implementations should be ascertained with reference to the issued claims.

As used herein, the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to more clearly describe some elements. As used herein, the terms "coils", "pipes", and "tubes" are used individually or in combination to mean the internal fluid carrying elements of a fired heater.

In general, the present disclosure relates to a system and method for the repair and sealing of pipe leaks. More specifically, the present disclosure relates to the modular repair and sealing of leaks in pipelines under pressure that does not require shutting down the pipeline.

Embodiments of the present disclosure provide modular leak repair enclosures in a side-by-side configuration to extend seal length and/or create varying configurations to enclose a pipe section of a pipe having a leak. The enclosures can be straight, angled, and have multiple branches and remain within the purview of the present disclosure. Each enclosure includes a first enclosure half having a first enclosure face and a second enclosure half having a second enclosure face. Enclosure faces mate together face-to-face to create an enclosure having a void cavity through which the pipe extends. Sealant grooves extend along the sealant faces. Sealant may be injected in the sealant grooves to seal the mated enclosure faces of one enclosure or a multiple of connected enclosures. A seal blocking system having blocking members that may be formed by shut-off screws are used in a method to control sealant flow in the sealant grooves to help form continuous seals along the enclosure faces to seal an enclosure or connected enclosures covering a pipe section.

Referring to FIG. 1, a modular enclosure system 100 according to some of the embodiments of the present disclosure is shown. Modular enclosure system 100 may be referred to as a modular pipe repair enclosure system. Modular enclosure system 100 may include a plurality of connected enclosures 102 with two enclosures 102 shown in the embodiment depicted in FIG. 1. Modular enclosure system 100 may have a single enclosure 102 in some embodiments and two or more enclosures 102 in other embodiments. Each enclosure 102 includes a first enclosure portion that may be formed by a first enclosure half 104 and a second enclosure portion that may be formed by a second enclosure half 106. Second enclosure half 106 may have a similar construction as the first half enclosure 104 for each of the enclosures 102. Enclosure halves 104, 106 are placed over one another in a mated configuration around a pipe 12 to form each of the enclosures 102, as shown in FIG. 1. Each enclosure 102 may be sealed to contain a leak in the pipe 12 by injecting a sealant into grooves, shown in FIG. 2, to provide a seal between the enclosure halves 104, 106 and to contain the pipe leak, as discussed below. Two enclosures 102 may be coupled together by a coupler 108 to form the modular enclosure system 100. Coupler 108 may have a first coupler half 109 and a second coupler half 110.

Figure 2:
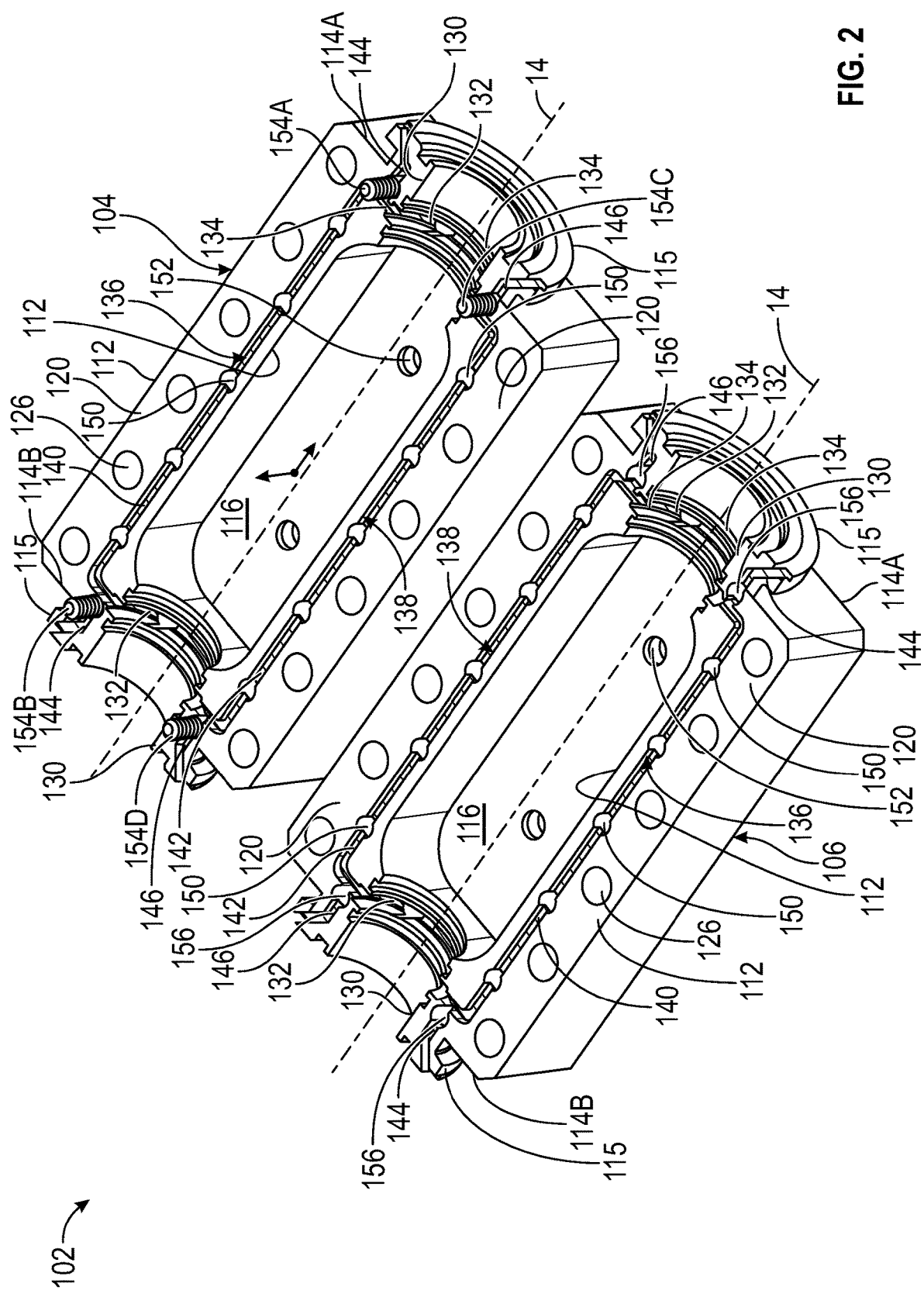
FIG. 2 is a perspective view of enclosure halves of an enclosure in a non-assembled position in accordance with embodiments of the present disclosure.

Referring to FIG. 1 and FIG. 2, the enclosure 102 includes a void section 112, a pair of end sections 114, and a pair of hubs 115. Each enclosure half 104, 106 has one-half of the void section 112, end sections 114, and hubs 115. Void section 112 extends between the end sections 114 and each end section 114 has an attached hub 115. Hubs 115 are configured for coupling one enclosure 102 to another enclosure 102 in a side-by-side configuration. FIG. 2 shows an enclosure 102 in a non-assembled position where the first enclosure half 104 and the second enclosure half 106 are separated from one another to illustrate an inner section of the enclosure 102. Void section 112 forms and encloses a void section cavity 116.

Enclosure halves 104, 106 each have an enclosure face 120. Enclosure faces 120 oppose one another when the enclosure 102 is in the mated configuration, and the enclosure 102 has a split-line intersection 122 formed by the enclosure faces 120, as shown in FIG. 1. One enclosure face 120 may abut against another enclosure face 120 when the enclosure halves 104, 106 are in the mated configuration. Enclosure halves 104, 106 may be connected by mechanical fasteners such as bolts. Bolts may extend through fastener holes 126 that extend in the body of each of the enclosure halves 104, 106.

Enclosure halves 104, 106 connected in the mated configuration enclose the pipe 12 at a pipe section where a leak may have been detected. The pipe section with the leak is enclosed in the void section 112 of the enclosure 102. Void section 112 extends axially along the pipe section with the leak and covers the circumference of the pipe section. The pipe section in the void section 112 is configured to be spaced from an internal diameter of the void section 112. Void section cavity 116 leads to an end bore section 130 in each of the end sections 114. Each end section 114 may be referred to as an end plate.

End bore section 130 extends axially along the pipe 12 and around the circumference of the pipe 12. End bore sections 130 each forms an opening in its end section 114 configured to accommodate the enclosed pipe 12 extending through the end bore sections 130. End bore section 130 may have a circular cross-section shape to conform to the pipe 12. The internal diameter of the end bore section 130 is configured to be less than the internal diameter of the void section 112 forming the void section cavity 116. As shown in FIG. 2, a bore groove 132 is formed in the end bore section 130 and configured such that a seal may be formed around the circumference of the pipe 12 at the end section 114. Bore groove 132 extends 360 degrees around the end bore section 130. Bore groove 132 may be formed by a pair of spaced-apart static seals 134. Static seals 134 may extend 360 degrees around the end bore section 130 of the enclosure 102. Each enclosure half 104, 106 may form 180 degrees of the bore groove 132.

Enclosure 102 has a first primary groove 140 and a second primary groove 142 in the void section 112 and each are on opposite sides of a first axis 14 extending through the enclosure 102. First axis 14 may be a center axis of the enclosure 102. Each of the primary grooves 140, 142 extend axially along an opposite side of the void section cavity 116 and is configured for sealing the void cavity 116 at the split-line intersection 122 formed by the enclosure halves 104, 106. As shown in FIG. 2, enclosure faces 120 of each enclosure half 104, 106 have a channel that forms the primary grooves 140, 142. Primary grooves 140, 142 may extend continuously along the axial length of the void section 112. Opposite ends of each of the primary grooves 140, 142 connect to one of the bore grooves 132 in each of the end sections 114.

Enclosure 102 has a first end groove 144 and a second end groove 146 in the enclosure face 120 at each of the end sections 114 and the end grooves 144, 146 each are connected to one of the primary grooves 140, 142. End grooves 144, 146 each extend from its connection to the first primary groove 140 or the second primary groove 142 to the end of one of the hubs 115. Primary grooves 140, 142 and the end grooves 144, 146 may form continuous grooves on opposite sides of the void section cavity from the end of one of the hubs 115 to the end of the other hub 115.

First primary groove 140 and the first end groove 144 together form a first sealant groove 136. First sealant groove 136 extends from a hub 115 on one end of the enclosure 102 to a hub 115 on an opposite end of the enclosure 102. Second primary groove 142 and the second end groove 146 together form a second sealant groove 138. Second sealant groove 138 extends from a hub 115 on one end of the enclosure 102 to a hub 115 on an opposite end of the enclosure 102. First sealant groove 136 and the second sealant groove 138 are on opposite sides of the first axis 14.

Injection ports 150 are formed in the enclosure 102 and extend from an outer surface of the enclosure 102 to the first sealant groove 136 and the second sealant groove 138. Injection ports 150 may be spaced apart from one another for injecting sealant in different locations along the sealant grooves 136, 138. In some embodiments, one or more injection ports 150 may connect to the bore grooves 132. Fluid ports 152 may extend from the outer surface to an inner surface of the void section 112 for venting gases or liquids during installation of the enclosure 102 on the pipe 12.

A sealant control system is formed in the enclosure 102 to selectively block the flow of sealant that is injected in the sealant grooves 136, 138 and the bore grooves 132. The sealant control system is formed by a plurality of blocking members 154 configured to block sealant flow between the end grooves 144, 146 and the primary grooves 140, 142 and the bore grooves 132. Blocking members 154 each may be a shut-off screw or bolt.

As shown in FIG. 2, a first blocking member 154A and a second blocking member 154B are disposed in a first sealant groove 136 and a third blocking member 154C and a fourth blocking member 154D are disposed in a second sealant groove 138. End section 114A includes the first blocking member 154A and the third blocking member 154C. End section 114B includes the second blocking member 154B and the fourth blocking member 154D. Blocking members 154A-154D are similarly constructed. In some embodiments, blocking members 154A-154D may be in the hubs 115. Blocking members 154A-154D may be generally referred to as blocking members 154.

At the first end section 114A, the first blocking member 154A is configured to block sealant flow between the first primary groove 140 and the first end groove 144. At the first end section 114A, the third blocking member 154C is configured to block sealant flow between the second primary groove 142 and the second end groove 146. At the second end section 114B, the second blocking member 154B is configured to block sealant flow between the first primary groove 140 and the first end groove 144. At the second end section 114B, the fourth blocking member 154D is configured to block sealant flow between the second primary groove 142 and the second end groove 146.

Blocking members 154A 154C at first end section 114A are axially spaced between the bore groove 132 and the adjacent hub 115 and the blocking members 154B, 154D at the second end section 114B are axially spaced between the bore groove 132 and the adjacent hub 115, as shown in FIG. 2. Blocking members 154A-154D each may be perpendicular to the enclosure face 120. In some embodiments, the blocking members 154A-154D may be disposed in the hub 115.

Blocking members 154 may be configured to function as alignment members. Blocking members 154 each include an extension section that extends from the enclosure face 120 of the enclosure half 104. Enclosure half 106 has receiving hole sections 156 that are each sized to receive the extension section of one of the blocking members 154. Each receiving hole section 156 intersects one of the end grooves 144, 146 and extends into the body of the enclosure half 106. In some embodiments, each receiving hole section 156 may form a blind hole in the enclosure half 106 to not extend to the outer surface of the enclosure half 106. Receiving hole sections 156 may not have internal threads in some embodiments. When positioning the enclosure halves 104, 106 together, the blocking members 154 each fit in a respective hole section 156 to align the enclosure faces 120 as the enclosure halves 104, 106 are assembled in the mated configuration. In this manner, the blocking members 154 function as alignment pins during the assembly of the enclosure 102 on the pipe 12. Assembling the enclosure halves 104, 106 in the mated configuration to create the enclosure 102 results in the formation of the primary grooves 140, 142, and the end grooves 146, 148, and the bore grooves 132 in the enclosure 102.

Figure 4:
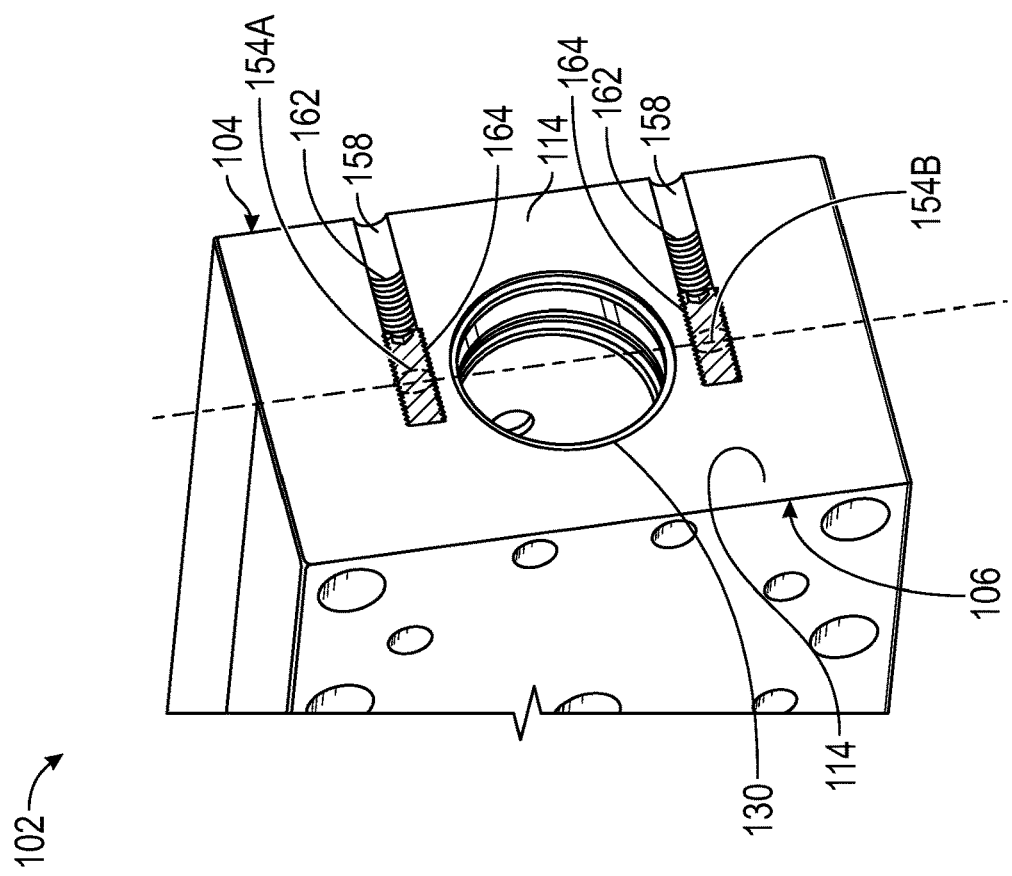
FIG. 4 is a perspective view of a portion of the enclosure of FIG. 1 taken along the line 3-6 showing blocking members in a blocking position in accordance with embodiments of the present disclosure.
Figure 3:
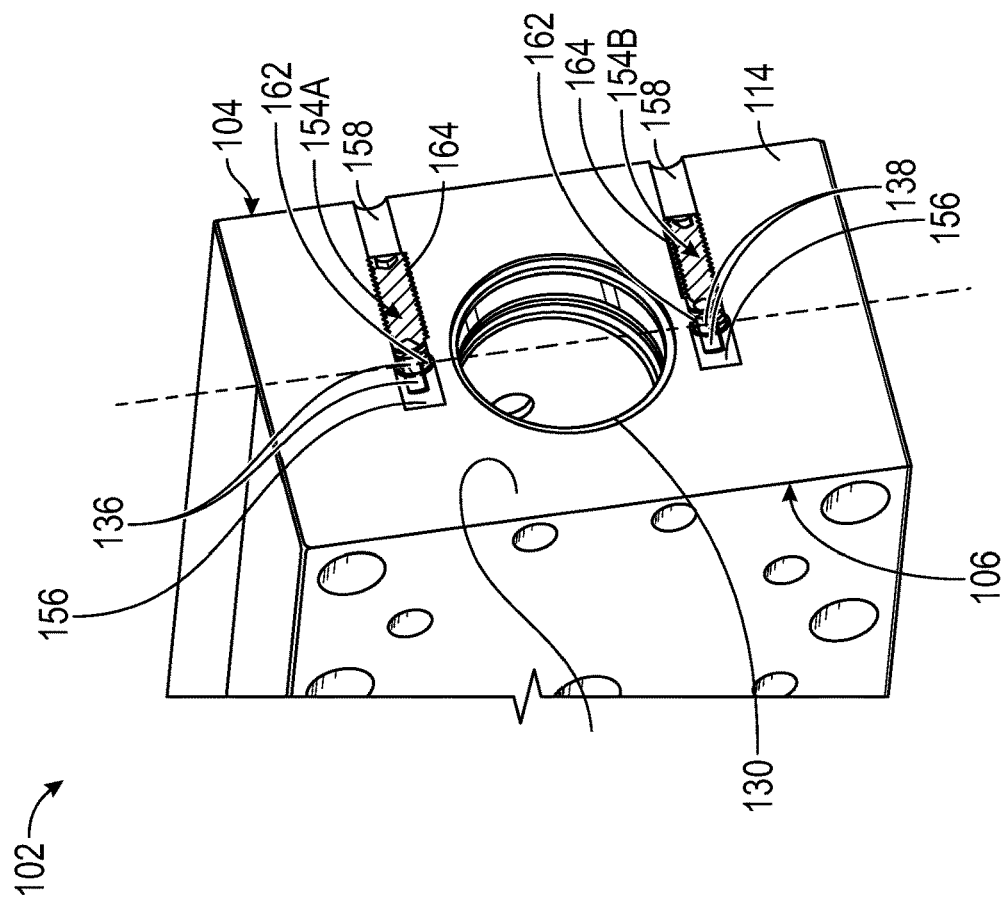
FIG. 3 is a perspective view of a portion of the enclosure of FIG. 1 taken along the line 3-6 showing blocking members in a non-blocking position in accordance with embodiments of the present disclosure.

Referring to FIG. 3 and FIG. 4, blocking members 154A, 154B may be positioned between a non-blocking position, shown in FIG. 3, and a blocking position, shown in FIG. 4. Each blocking member 154A, 154B is disposed in an adjustment hole section 158. Each adjustment hole section 158 extends from the outer surface to the enclosure face 120 of the enclosure half 104. A receiving hole section 158 is disposed in the enclosure half 106. Together the adjustment hole section 158 and the receiving hole section 156 form a blocking hole section. Each of the adjustment hole sections 158 has internal threads 162 along an axial section and the blocking members 154A, 154B may have external threads 164 that mate with the internal threads 162. Some embodiments of the blocking members 154 and the adjustment hole sections 158 may have other conventional thread configurations that provide for axial movement of the blocking members 154.

In some embodiments, threads 162, 164 for each blocking member device may be configured to limit the axial movement of each of the blocking members 154 so that the blocking members 154 may not be removed from the enclosure half 104 while retracting or inserting the blocking members 154 between the blocking position and the non-blocking position. At one end of the blocking members 154 may be an adjustment member such as a socket for use in rotating the blocking members 154 with an adjustment tool between the non-blocking position and the blocking position. For example, a screwdriver or wrench may be inserted into an adjustment hole section 158 to engage a socket to rotate a blocking member 154. Mating threads 162, 164 for each blocking member 154A, 154B and adjustment hole section 158 may be configured to limit the axial movement of each of the blocking members 154 to prevent the blocking members from being removed from the enclosure half 104.

When in the non-blocking position shown in FIG. 3, the blocking members 154A, 154B are retracted in their respective adjustment hole sections 158 and the sealant grooves 136, 138 are open for sealant flow at the intersection of the sealant grooves 136, 138 and the blocking hole sections through which the blocking members 154A, 154B extend when in the blocking position.

When in the blocking position shown in FIG. 4, the blocking members 154A, 154B have been inserted in the receiving hole section 156 so that the blocking members 154A, 154B each block one of the sealant grooves 136, 138. Blocking members 154A, 154B each extend across one of the sealant grooves 136, 138 to block the sealant grooves 136, 138. In the embodiments, each of the blocking members 154 has a diameter that is larger than the diameter of the section of the first sealant groove 136 or the second sealant groove 138 that it intersects and blocks. The relatively larger diameter of the blocking members 154 helps provide substantial blockage of sealant flowing in the sealant grooves 136, 138 by the blocking members 154 when in the blocking position.

Figure 5:
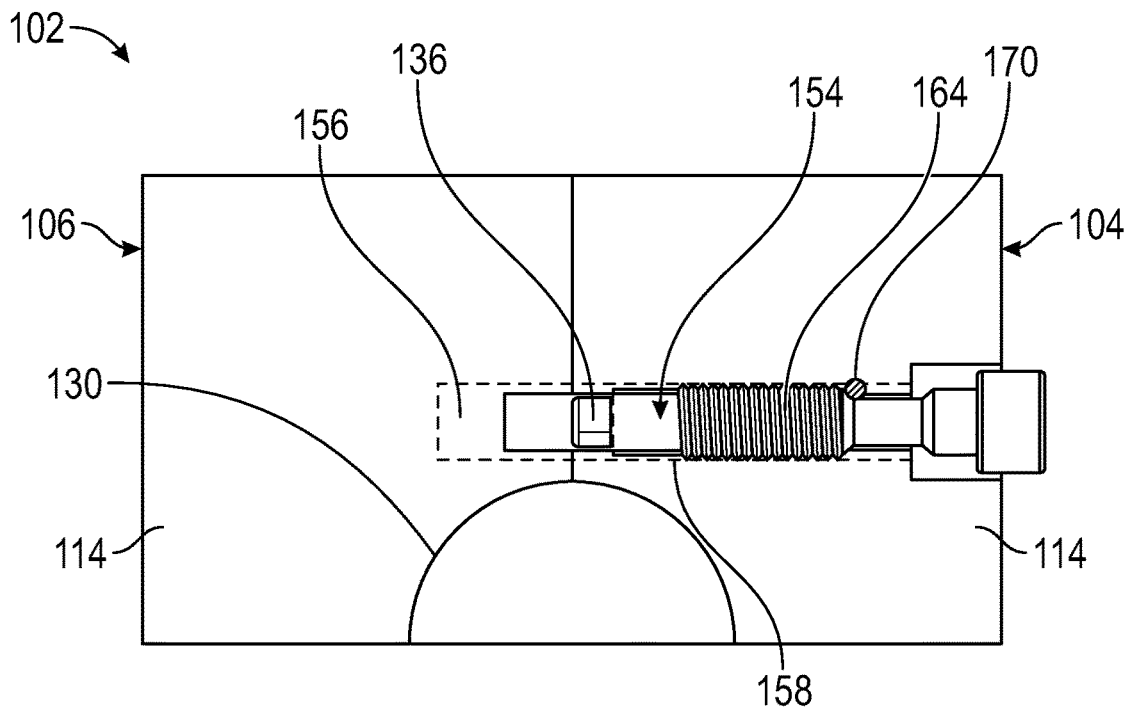
FIG. 5 is a side view of a portion of the enclosure of FIG. 1 taken along the line 3-6 showing a blocking member in the non-blocking position in accordance with embodiments of the present disclosure.
Figure 6:
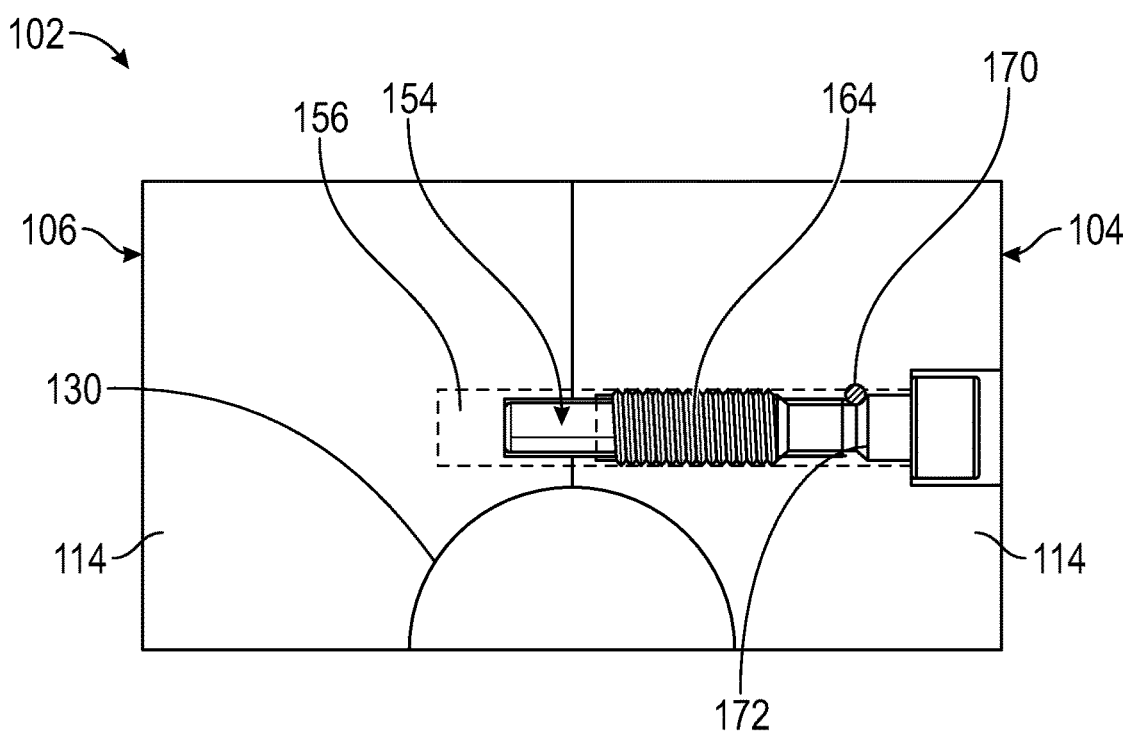
FIG. 6 is a side view of a portion of the enclosure of FIG. 1 taken along the line 3-6 showing a blocking member in the blocking position in accordance with embodiments of the present disclosure.

Referring to FIG. 5 and FIG. 6, an alternative embodiment of a sealant blocking device at an end section 114 is shown. Blocking member 154 is disposed in the adjustment hole section 158. Adjustment hole section 158 may have threads that mate with the external threads 164 on the blocking member 154 for adjusting the axial position of the blocking member 154. A position limiting member formed by a pin 170 may be disposed in the adjustment hole section 158 to limit the axial positioning of the blocking member 154. Pin 170 may have an elongated shape and may be fixed within the enclosure half 104.

FIG. 5 shows the blocking member 154 in the non-blocking position. Pin 170 may abut against a shoulder of external threads 164 of the blocking member 154 when the blocking member 154 is axial retracted when moving from the blocking position, shown in FIG. 6, to the non-blocking position, shown in FIG. 5. This abutment of the external threads 164 against the positioning pin 170 blocks the blocking member 154 from retracting further in the adjustment hole section 158 and being removed from the enclosure half 104. By preventing further retraction of the blocking member 154 via the pin 170, there is the benefit that the blocking member 154 will not be inadvertently removed and potentially misplaced.

Referring to FIG. 6, pin 170 may be used for limiting the axial positioning of the blocking member 154 when moving from the non-blocking position to the blocking position. Pin 170 may abut against a shoulder 172 of the blocking member 154 when the blocking member 154 is inserted and moved from the non-blocking position, shown in FIG. 5, to the blocking position, shown in FIG. 6. This abutment of the shoulder 172 against the positioning pin 170 blocks the blocking member 154 to limit axial movement as the blocking member 154 is inserted in the adjustment hole section 158.

Figure 7:
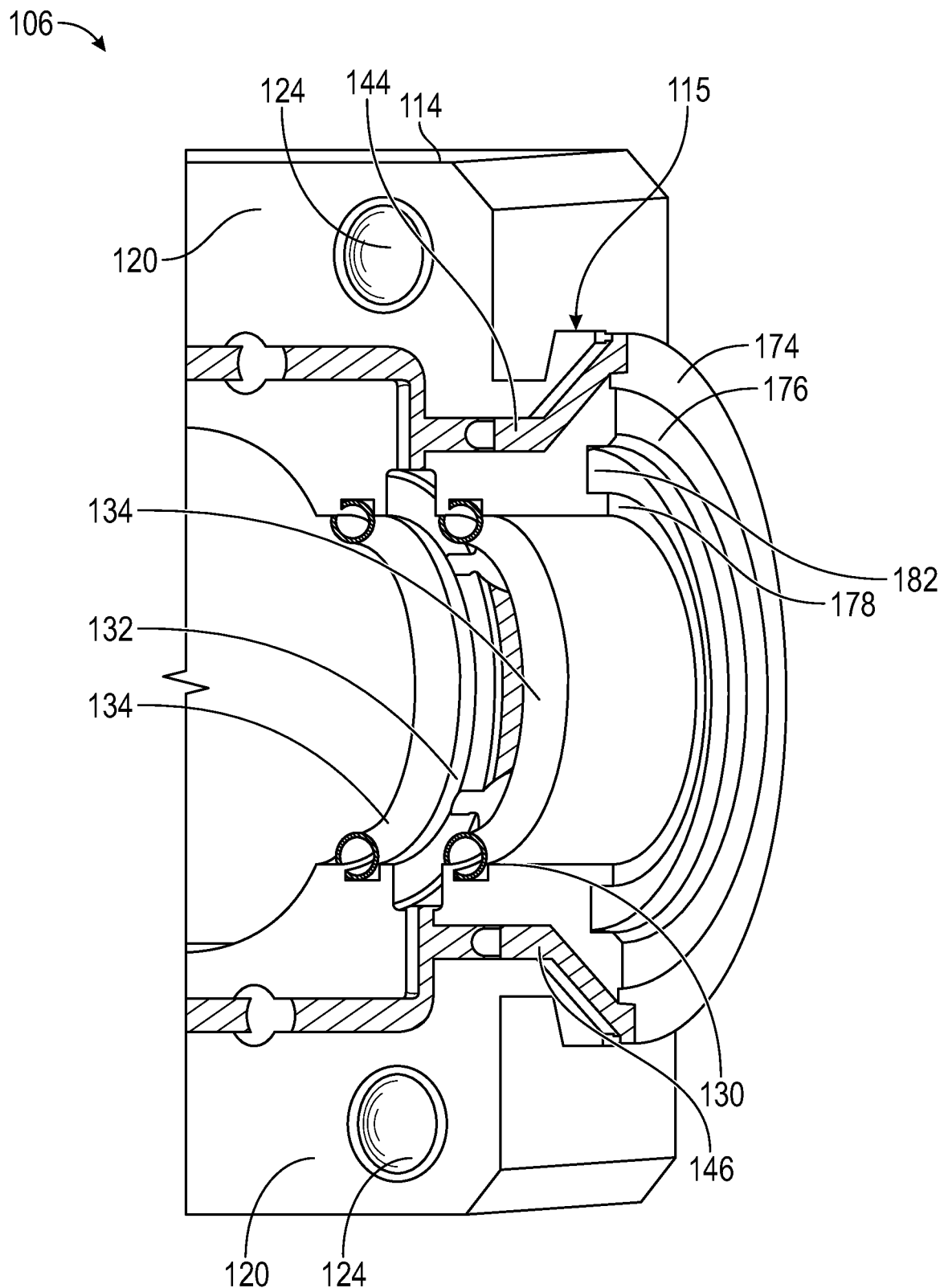
FIG. 7 is a perspective view of a portion of an enclosure half of FIG. 2 showing an end section and a hub of the enclosure half.

Referring to FIG. 7, a perspective view showing a hub half 115 connected to the end section 114 of the second enclosure half 106 for an enclosure half 106 is shown. Hub half 115 forms one half of a hub 115 and two mated hub halves 115 may be designated as hub 115. Hub halves 115 forming a hub 115 have a similar construction. Hub half 115 has a hub face including a first hub groove 174, a first hub ring 176, and a second hub ring 178. First hub ring 176 extend axially outwards from the first hub groove 174 to form an outer lip. First hub ring 176 forms an inner shoulder to the first hub groove 174.

Second hub ring 178 extend axially outwards to form an outer lip. An inner groove 182 is formed between the first hub ring 176 and the second hub ring 178. First hub ring 176 extends axially outwards from the second hub ring 178. First hub groove 174, first hub ring 176, and second hub ring 178 extend 360 degrees around the hub face and the end bore section 130 when hub halves are mated to form the hub 115.

First end groove 144 extends along the enclosure face 120 from the end section 114, to the hub half 115 and to the first hub groove 174. Second end groove 146 extends along the enclosure face 120 from the end section 114, to the hub half 115 and to the first hub groove 174. First end groove 144 and second end groove 146 intersect the first hub groove 174 at different locations in the first hub groove 174 and are spaced-apart 180 degrees from one another. End section 114 shown in FIG. 7 shows in more detail a pair of static seals 134 that form the bore groove 132 therebetween. Fasteners, such as bolts 124, may extend through fastener holes 126 to connect enclosure half 106 to another enclosure half.

Figure 8:
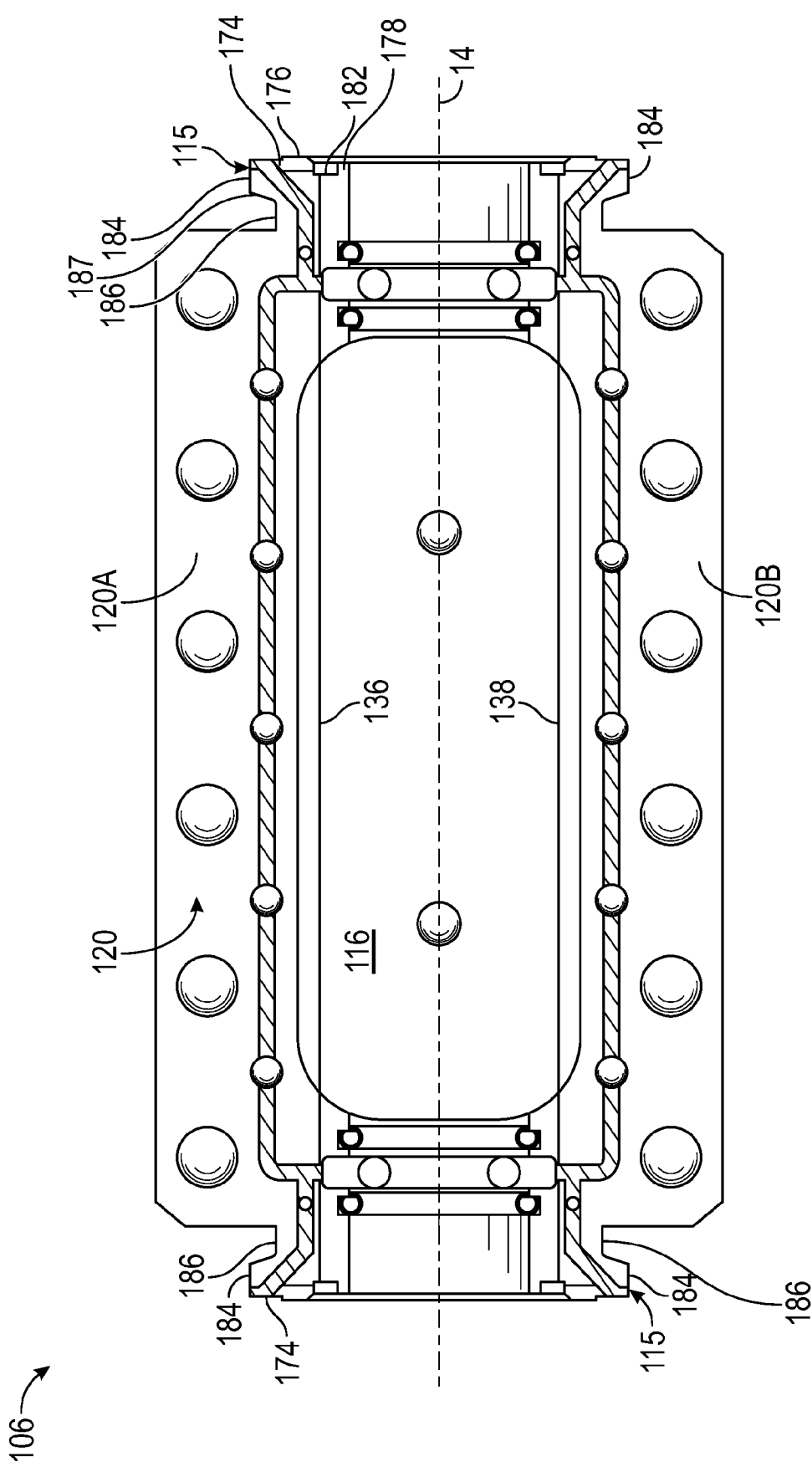
FIG. 8 is a side view of an enclosure half of FIG. 2.

Referring to FIG. 8, a side view of the enclosure half 106 is shown. Hub half 115 has a hub lip 184 extending radially outwards from a base surface 186 and extends 180 degrees around the hub half 115. Hub lip 184 has a shoulder wall 187 that extends from the base surface 186 at an angle so that the hub lip 184 has a wedge shape. First hub ring 176 in the hub face structure extends axially outwards from the first hub groove 174 and the inner groove 182. Second hub ring 178 in the hub face structure extends axially outwards from the inner groove 182. First hub ring 176 extends axial further than second hub ring 178.

Enclosure face 120 of enclosure half 106 has a first enclosure face 120A and a second enclosure face 120B. Enclosure faces 120A, 120B lie in a plane that extends through the split-line intersection 122, shown in FIG. 1, and the first axis 14. First enclosure face 120A is on one side of the first axis 14 and the second enclosure face 120B is on an opposite side of the first axis 14. First sealant groove 136 extends along the first enclosure face 120A from a first hub groove 174 on the hub face on one end of the enclosure half 106 to a first hub groove 174 on the hub face on an opposite end of the enclosure half 106. Second sealant groove 138 extends along the second enclosure face 120B from a first hub groove 174 on the hub face on one end of the enclosure half 106 to a first hub groove 174 on the hub face on an opposite end of the enclosure half 106.

Figure 9:
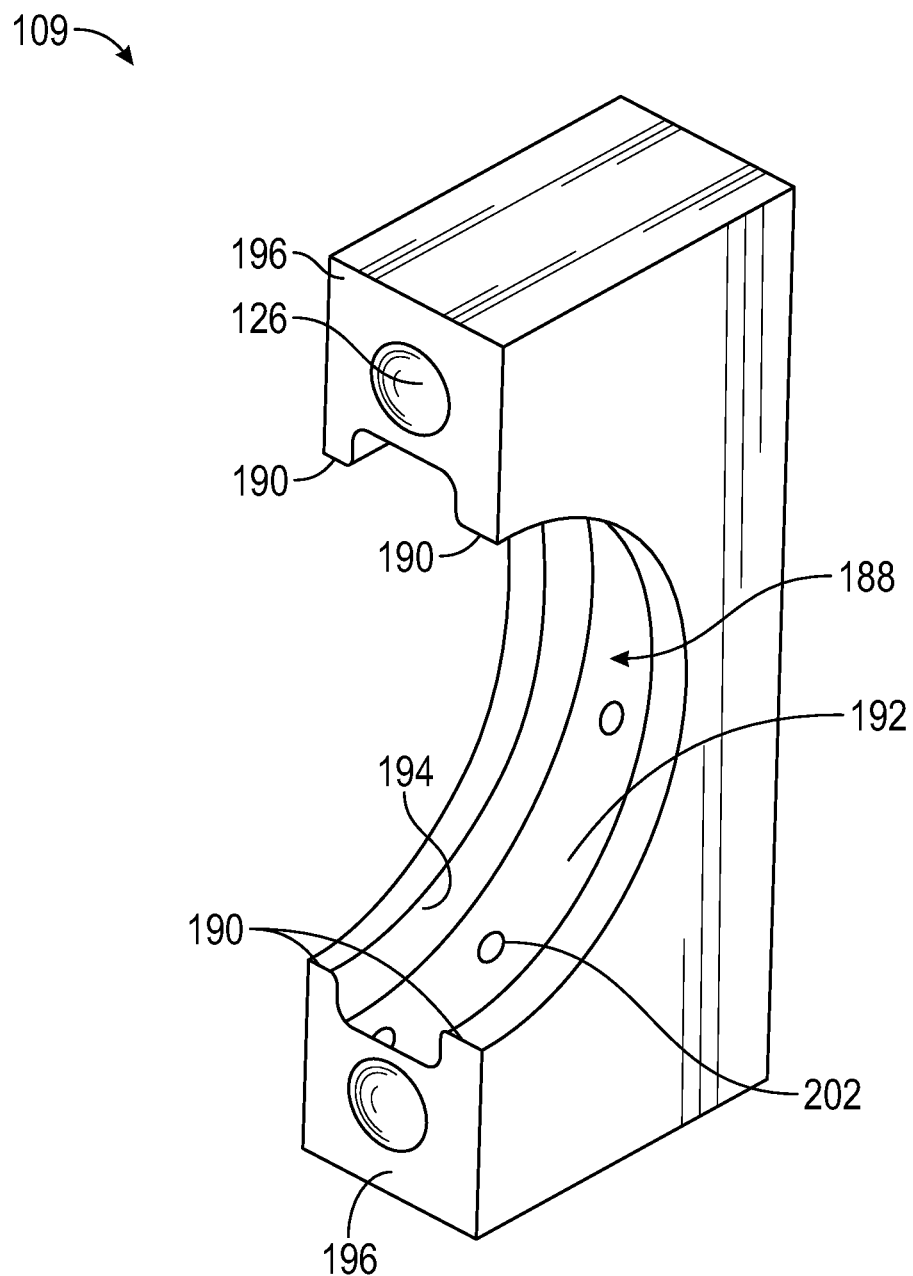
FIG. 9 is a perspective view of a coupler half in accordance with embodiments of the present disclosure.

Referring to FIG. 9, the second coupler half 109 is shown. First coupler half 108 and the second coupler half 109 may be connected to form the coupler 108 for coupling two enclosures, as shown in FIG. 1. Coupler halves 108, 109 are of similar construction. Coupler half 109 has a coupler groove 188 formed by a pair of coupler external lips 190 that are spaced apart with a coupler outer wall 192 disposed between the coupler external lips 190. Coupler external lips 190 each have a wedge shaped shoulder 194 that is configured to conform to the hub lip 184 of the hub 115. Coupler half 109 has a pair of coupler faces 196. Coupler faces 196 of each of the coupler halves 108, 109 oppose one another when mated together as shown in FIG. 1. Each coupler face 196 may have a fastener hole 200 in the body of each of the couplers 108, 109. Mechanical fasteners such as bolts may extend through fastener holes to connect the coupler halves 108, 109. Injection ports 202 may extend through the body of the coupler halves 108, 109 for injecting sealant in the coupler groove 188.

Figure 10:
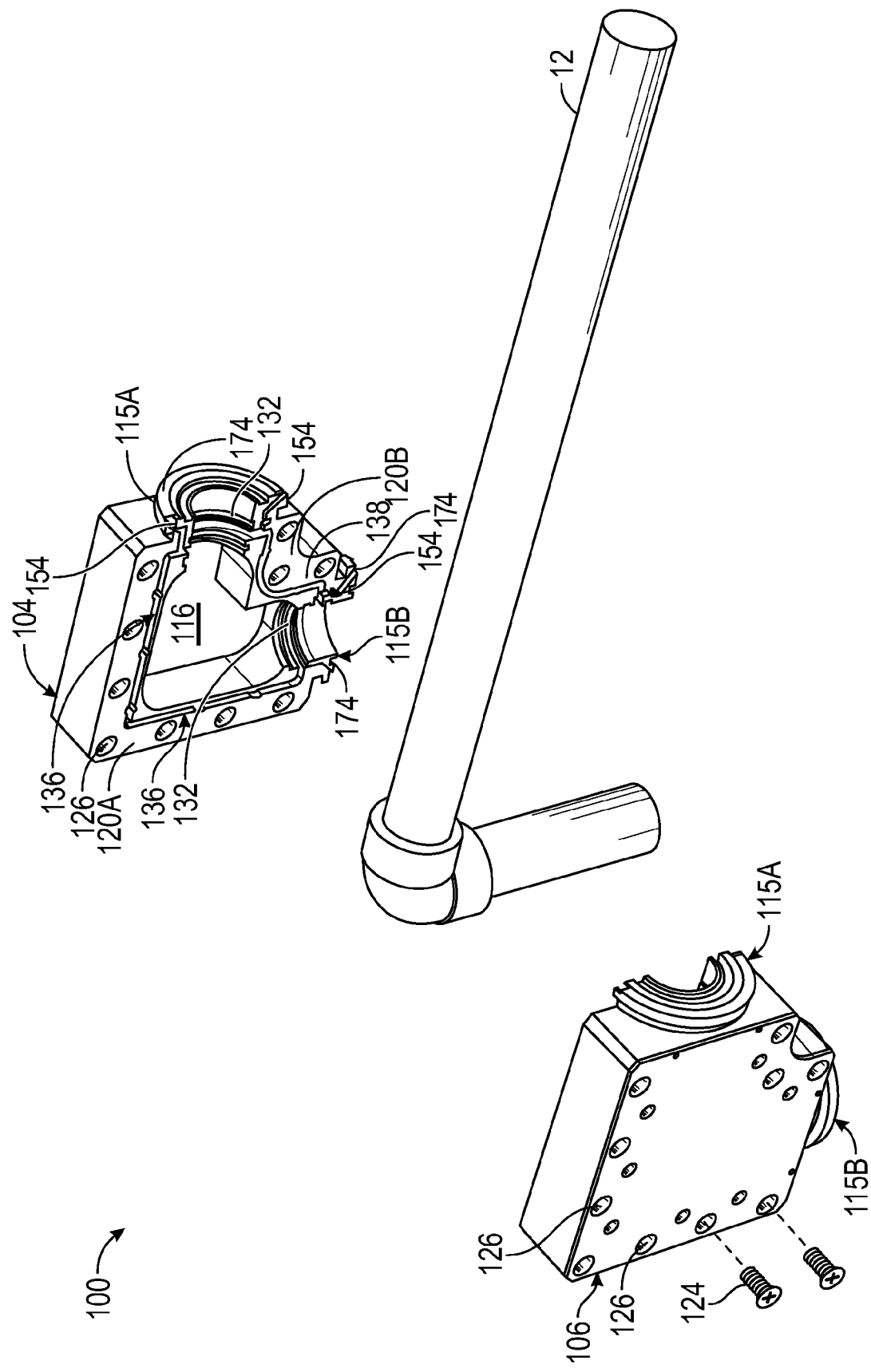
FIGS. 10-13 is a series of perspective views of an assembly of the modular enclosure system on a pipe accordance with embodiments of the present disclosure.
Figure 11:
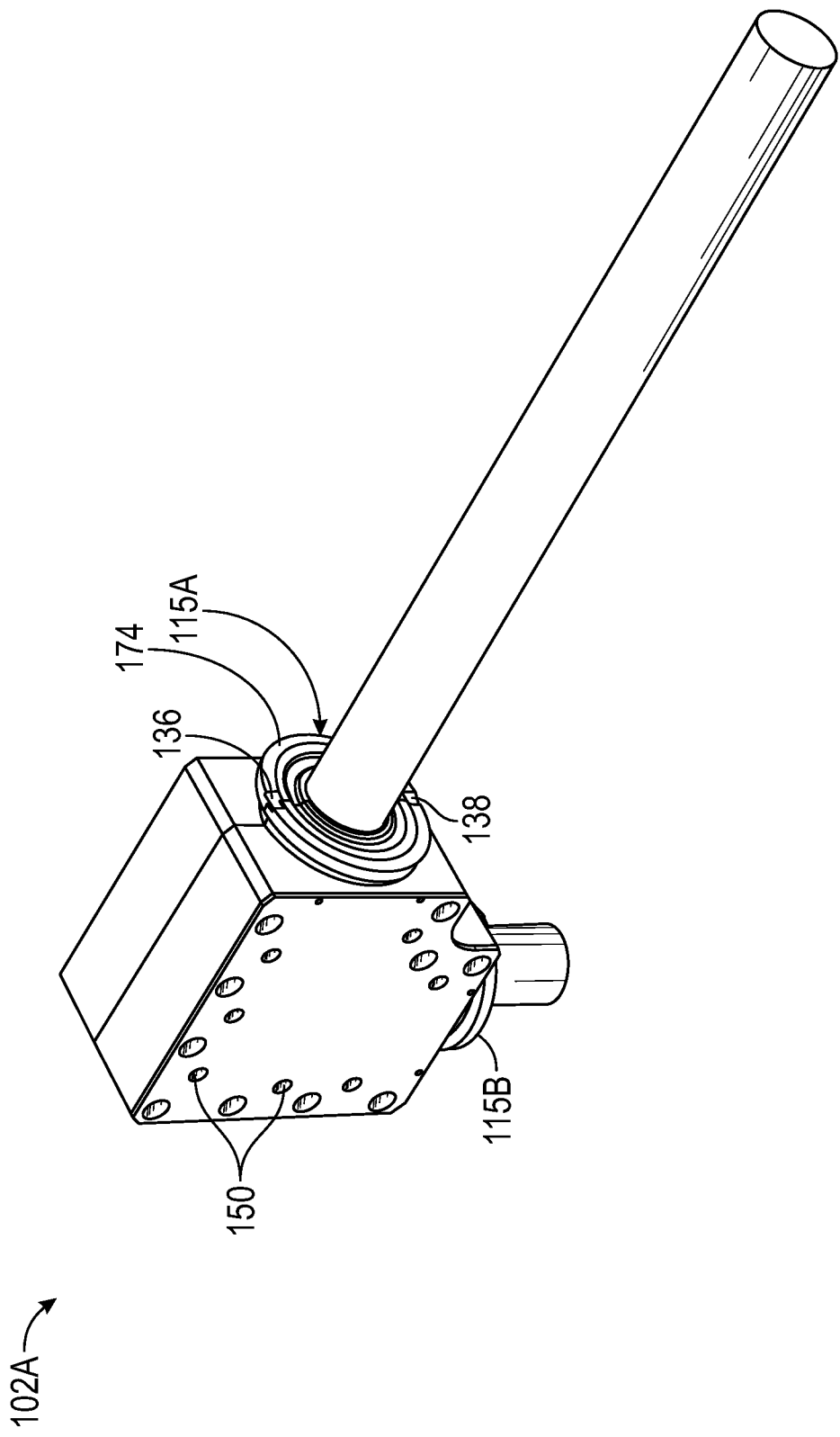

Referring to FIGS. 10-13, an assembly of the modular enclosure system 100 on a pipe 12 is shown. FIG. 10 shows a first enclosure half 104 and a second enclosure half 106 that are spaced apart and being prepared for connecting over a first pipe section of the pipe 12 that may have a leak. Enclosure halves 104, 106 are configured to enclose an elbow joint of the pipe 12. Enclosure halves 104, 106 may be connected by mating the enclosure halves 104, 106 together in the mated configuration to enclose the pipe 12. FIG. 11 shows the enclosure halves 104, 106 connected in the mated configuration to form the first enclosure 102A. Bolts 124 may be inserted in fastener hole sections 126, shown in FIG. 10, to secure enclosure halves 104, 106 together.

Blocking members 154 are positioned in a blocking position in enclosure half 104, as shown in more detail in FIG. 2. Blocking members 154 are configured to function as alignment pins to align the enclosure halves 104, 106 so that the enclosure halves 104, 106 may be positioned together in the mated configuration. For example, as enclosure halves 104, 106 are moved from a non-assembled position, shown in FIG. 10, towards a mated configuration, shown in FIG. 11, the blocking members 154 are each inserted into a respective a receiving hole section 156 of enclosure half 106, as shown in FIG. 4 and FIG. 6. The blocking members 154 being inserted into the receiving hole sections 156 during the assembly of the enclosure 102A has the benefit of aligning the enclosure halves 104, 106 to improve the assembly method.

When the first enclosure 102A is in the mated configuration, the enclosure face 120 of each of the enclosure halves 104, 106 oppose one another to form the split-line intersection 122 of the first enclosure 102A. Fasteners such as bolts, shown in FIG. 7, are extended through fastener holes 126 to secure the enclosure 102A in the mated configuration. First sealant groove 136 extends along the first enclosure face 120A from a first hub 115A to a second hub 115B. Second sealant groove 138 extends along the second enclosure face 120B from the first hub 115A to the second hub 115B. Sealant grooves 136, 138 each intersect with the first hub groove 174 in the hub face of each of the hubs 115A, 115B.

With the blocking members 154 in the blocking position, sealant may be injected in the injection ports 150. Injected sealant from the injection ports 150 travels in the first sealant groove 136 between the blocking members 154 in the blocking position to block sealant from flowing to the hub face of each hub 115A, 115B. Injected sealant from injection ports connected to the second sealant groove 146 travels in the second sealant groove 146 between the blocking members 154 in the blocking position to block sealant from flowing to the hub face of each hub 115A, 115B. Injected sealant from the sealant grooves 136, 138 may flow to the bore groove 132 to form a circumferential seal between the first enclosure 102A and the pipe 12. Blocking members 154 act as a bridge in the sealant grooves 136, 138 to block the sealant to allow the sealant to set or cure in the sealant grooves 136, 138 and the bore grooves 132. Sealant in the sealant grooves 136, 138 form a continuous seal along the enclosure faces 120 of the enclosure halves 104, 106 to provide face seals between the blocking members 154 at opposite ends of the first enclosure 102A. In this manner, the pipe section of pipe 12 enclosed in the void cavity 116 of the first enclosure 102A is sealed to contain fluid leaks in the enclosed pipe section.

First enclosure 102A may have an axial length that enables the first enclosure 102A to enclose the leak in a first pipe section of pipe 12. Depending on the axial length of the first pipe section that needs to be enclosed, one or more enclosures may need to be coupled to the first enclosure 102A. In addition, the first enclosure 102A may have an axial length to enclose the leak in the first pipe section at a given time. At some time period after first enclosure 102A has been assembled on the pipe 12, another leak may be detected in a second pipe section that is adjacent to the first pipe section covered by the first enclosure 102A. In this case, the first enclosure is configured to be connected to another enclosure or coupled to a plurality of enclosures to enclose the second pipe section. Additional enclosures may be coupled to the enclosure 102A to select the axial length of the modular enclosure system 100 for different axial lengths of the pipe section or pipe sections that need to be enclosed to contain fluid leaks in the pipe 12.

One benefit of the modular enclosure system 100 is that the modularity of the modular enclosure system 100 helps to minimize the need for multiple different axial lengths for an enclosure. One or more standard enclosures of a standard axial length may enable a user to couple a selected number of enclosures together depending on the axial length of the pipe section or pipe sections needing leak repair.

Figure 12:
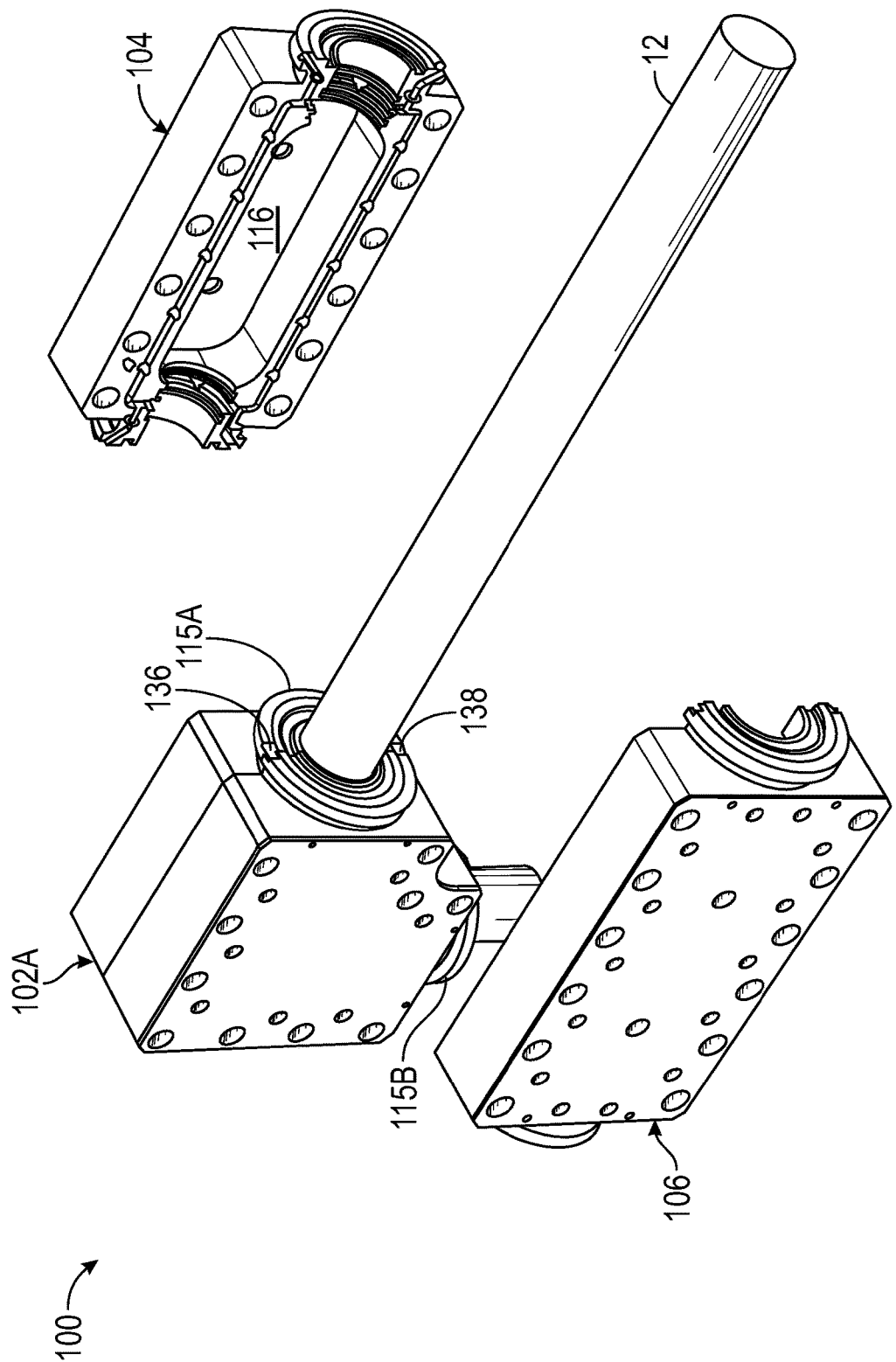
Figure 13:
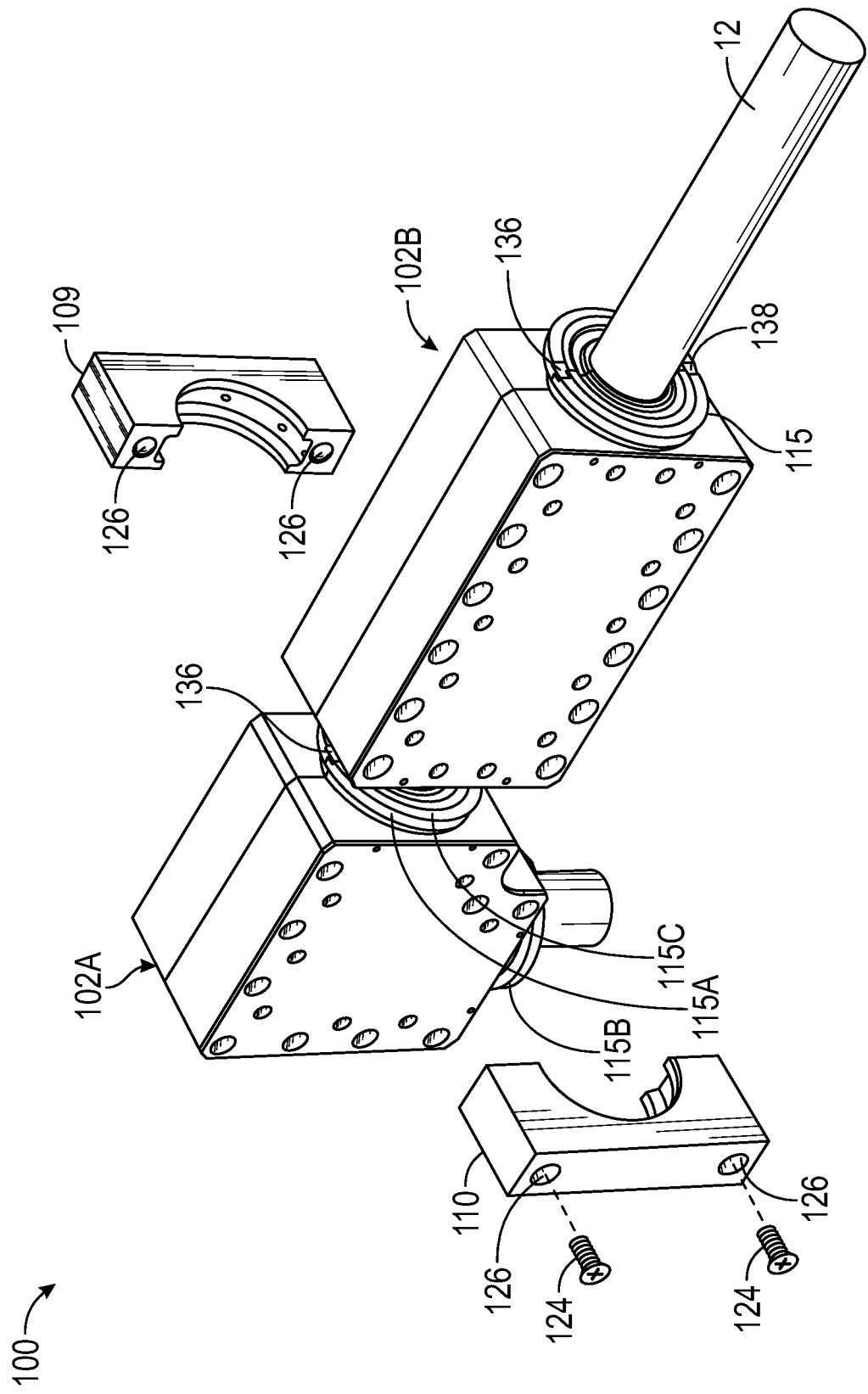

Referring to FIG. 12-13, the assembly of an enclosure 102B and connection to the enclosure 102A in a side-by-side configuration is shown. A first enclosure half 104 and a second enclosure half 106 of enclosure 102B in a non-assembled position is shown in FIG. 12. Enclosure halves 104, 106 are spaced apart and being prepared for connecting over a second pipe section axially adjacent to the enclosure 102A. FIG. 13 shows the enclosure halves 104, 106 connected to form the second enclosure 102B. Enclosure halves 104, 106 may be connected in the mated configuration by mating the enclosure halves 104, 106 together to enclose the pipe 12, as described with respect to the first enclosure 102A.

Enclosures 102A, 102B are positioned axial along the pipe 12 in a side-by-side configuration where the hub 115A of the first enclosure 102A and a hub 115C of the second enclosure 102B are positioned to oppose one another and are adjacent one another, as further shown in FIG. 13. With the enclosures 102A, 102B in the side-by-side configuration, spaced-apart coupler halves 109, 110 are positioned together to extend around the hub 115A of the enclosure 102A and the hub 115C of the enclosure 102B. Fasteners in the form of bolts 124 may be used to secure the coupler halves 109, 110 together in a mated configuration to secure enclosures 102A, 102B in the side-by-side configuration. FIG. 1 shows a coupler 108 securing the connection between the enclosures 102 in the side-by-side configuration.

Figure 14:
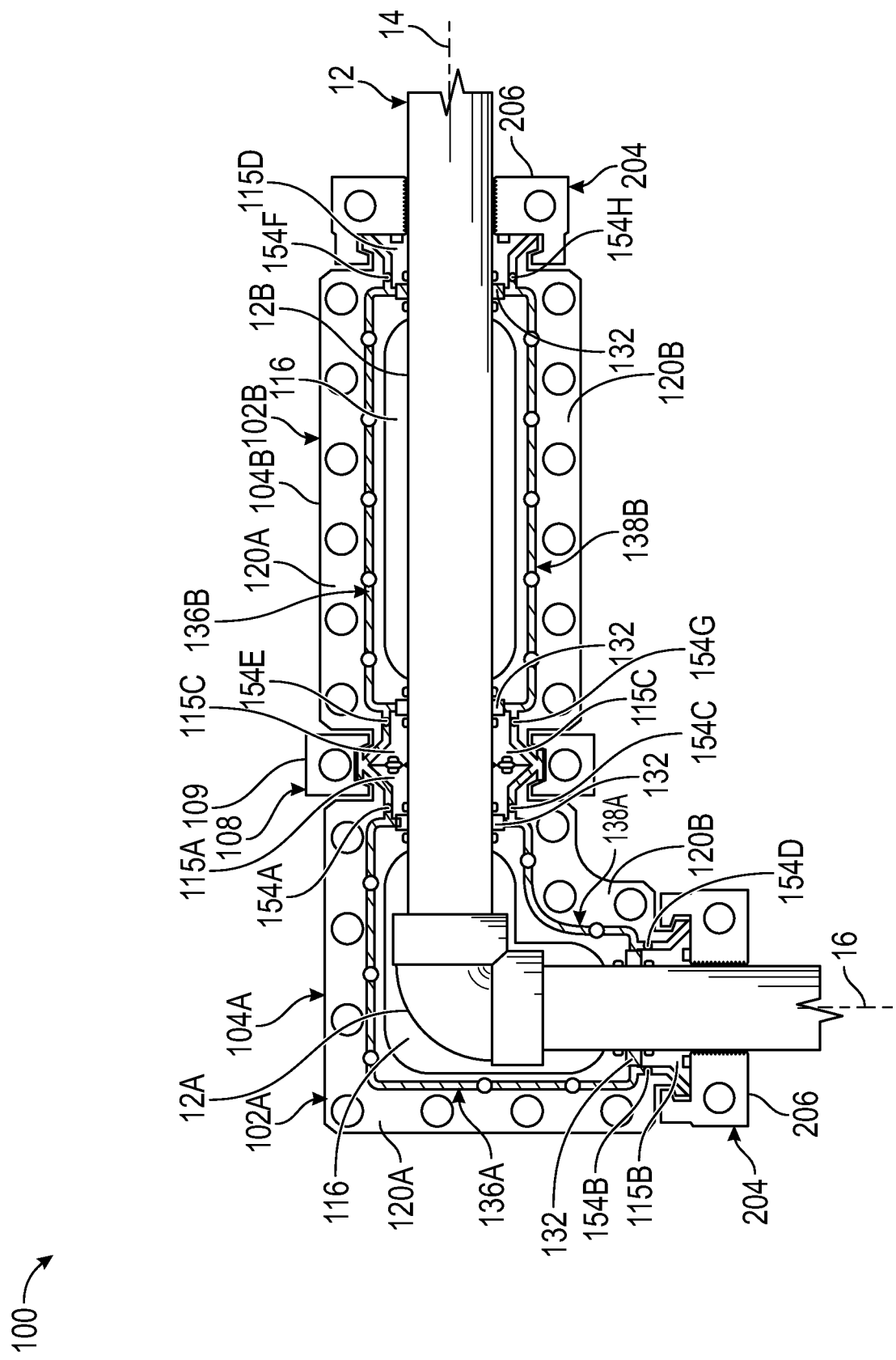
FIG. 14 is a side view of the modular enclosure system on a pipe showing a coupler half connecting enclosure halves in a side-by-side configuration in accordance with embodiments of the present disclosure.

Referring to FIG. 14, a side view of a left enclosure half 104A and a right enclosure half 104B of the modular enclosure system 100 connected via second coupler half 109 in the side-by-side configuration is shown. FIG. 14 shows one-half of the modular enclosure system 100 shown in FIG. 1 with enclosure halves 106 and the first coupler half 110, shown in FIG. 1, removed. A first pipe section 12A is enclosed by the left enclosure half 104A of the enclosure 102A and a second pipe section 12B is enclosed by the right enclosure half 104B of the enclosure 102B. Pipe section 12A is in the void cavity 116 formed by the left enclosure half 104A and the pipe section 12B is in the void cavity 116 formed by the right enclosure half 104B. Hub half 115A of the left enclosure half 104A and the hub half 115C of the enclosure half 104B are positioned adjacent one another at their faces. Coupler half 109 connects the hubs 115A, 115C together.

First sealant groove 136A in the left enclosure half 104A connects to a third sealant groove 136B in the right enclosure half 104B. Sealant grooves 136A, 136B continuously are connected so that together they extend between distal hub halves 115B, 115D. In other words, the first sealant groove 136A extends from hub half 115B along the first enclosure faces 120A of the left enclosure half 104A and is connected to the third sealant groove 136B via the connected hub halves 115A, 115C. Third sealant groove 136B extends from hub half 115D along the first enclosure faces 120A of the right enclosure half 104B and is connected to the first sealant groove 136A via the connected hub halves 115A, 115C. Sealant grooves 136A, 136B extend continuously from distal hubs 154B, 154D on a first side of the first axis 14 and a second axis 16.

Second sealant groove 138A in the left enclosure half 104A connects to a fourth sealant groove 138B in the right enclosure half 104B via connected hub halves 115A, 115C. Sealant grooves 138A, 138B extend continuously from distal hubs 115B, 115D on a second side of the first axis 14 and a second axis 16.

Blocking members 154A-154D are shown in the first enclosure 102A and blocking members 154E-154H are similarly shown in the second enclosure 102B. Blocking members 154A-154D of the first enclosure 102A have previously been described, see for example description of FIG. 2. First blocking member 154A and the second blocking member 154B are disposed in the first sealant groove 136A. First blocking member 154A is positionable in the blocking position to block sealant flow in the first sealant groove 136A at a first blocking location and the second blocking member 154B is positionable in the blocking position to block sealant flow in the first sealant groove 136A at a second blocking location. Third blocking member 154C is positionable in the blocking position to block sealant flow in the second sealant groove 138 at a third blocking location and the fourth blocking member 154D is positionable in the blocking position to block sealant flow in the second sealant groove 138 at a fourth blocking location.

Blocking members 154E-154H are constructed in the second enclosure 102B in a similar manner. For example, a fifth blocking member 154E and a sixth blocking member 154F are disposed in a third sealant groove 136B in a manner similar to the first blocking member 154A and the second blocking member 154B disposed in the first sealant groove 136A of the first enclosure 102A. Fifth blocking member 154E is positionable in the blocking position to block sealant flow in the third sealant groove 136B at a fifth blocking location and the sixth blocking member 154F is positionable in the blocking position to block sealant flow in the third sealant groove 136B at a sixth blocking location. A seventh blocking member 154G and an eighth blocking member 154H are disposed in a fourth sealant groove 138B in a manner similar to the third blocking member 154C and the fourth blocking member 154D disposed in the second sealant groove 138 of the first enclosure 102A. Seventh blocking member 154G is positionable in the blocking position to block sealant flow in the fourth sealant groove 138B at a seventh blocking location and the eighth blocking member 154H is positionable in the blocking position to block sealant flow in the fourth sealant groove 138B at an eighth blocking location.

Bore grooves 132 are formed in the enclosure halves 104A, 104B for use in forming circumferential seals between the enclosure halves and the pipe 12 to seal the void cavities 116 at opposite ends of the enclosure halves 104A, 104B. Coupler groove section 188, as shown in FIG. 9, of coupler half 109 is disposed over the hub halves 115A, 115C and covers a hub split-line intersection.

First enclosure 102A is shown as not being connected to another enclosure at the hub half 115B. Hub half 115B of the enclosure 102A is secured to the pipe 12 by a strongback connector 206. Likewise, the second enclosure 102B is shown as not being connected to another enclosure at the hub half 115D. Hub half 115D is secured to the pipe 12 by a strongback connector 206. In some embodiments, strongback connector 206 may be a tongue-and-groove style that allows attachment to an enclosure without the use of connecting bolts (all thread/tie bars) or additional connection components.

Figure 15:
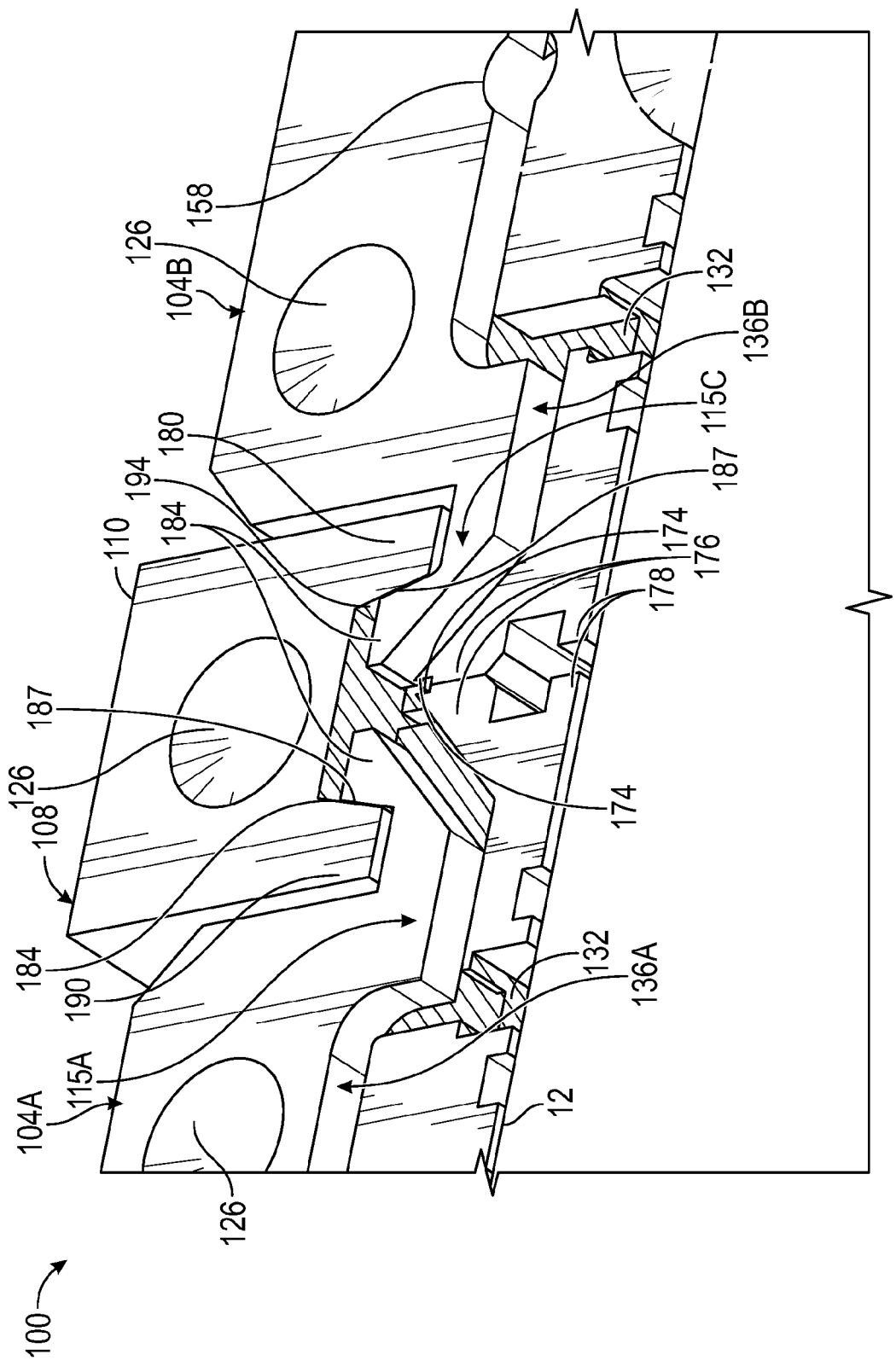
FIG. 15 is a perspective view of a portion of the modular enclosure system of FIG. 14.

FIG. 15 is a perspective view of a portion of the modular enclosure system 100 of FIG. 14 showing the connection of the hub half 115A of the left enclosure half 104A to the hub half 115C of the right enclosure half 104B. First hub rings 176 of the hubs 115A, 115C are disposed adjacent one another and abut against one another. Each first hub ring 176 extends axially outwards from the first hub groove 174, as also shown in FIG. 7. First hub grooves 174 of the adjacent half hubs 115A, 115C forms a groove at that the hub split-line intersection and extends along the circumference of the hub split-line intersection. In some embodiments a compressible seal ring may be positioned in or above the first hub groove 174. Second hub rings of the hubs 115A, 115C are spaced from one another in the mated configuration.

Hub lips 184 are spaced-apart from one another, as shown in FIG. 8 and FIG. 14.

External lips 190 of the second coupler half 110 each have a shoulder wall 194 that abuts against a shoulder walls 187 of one of the hub lips 184. External lips 190 of the second coupler half 110 and the hub lips 184 of the hubs 115A, 115C create a wedge action forcing the enclosure halves 106A, 106B towards one another to help secure connection of the enclosure halves 106A, 106B. Blocking members 154, shown in FIG. 14, may be in the non-blocking position and are not shown in FIG. 15.

Figure 16:
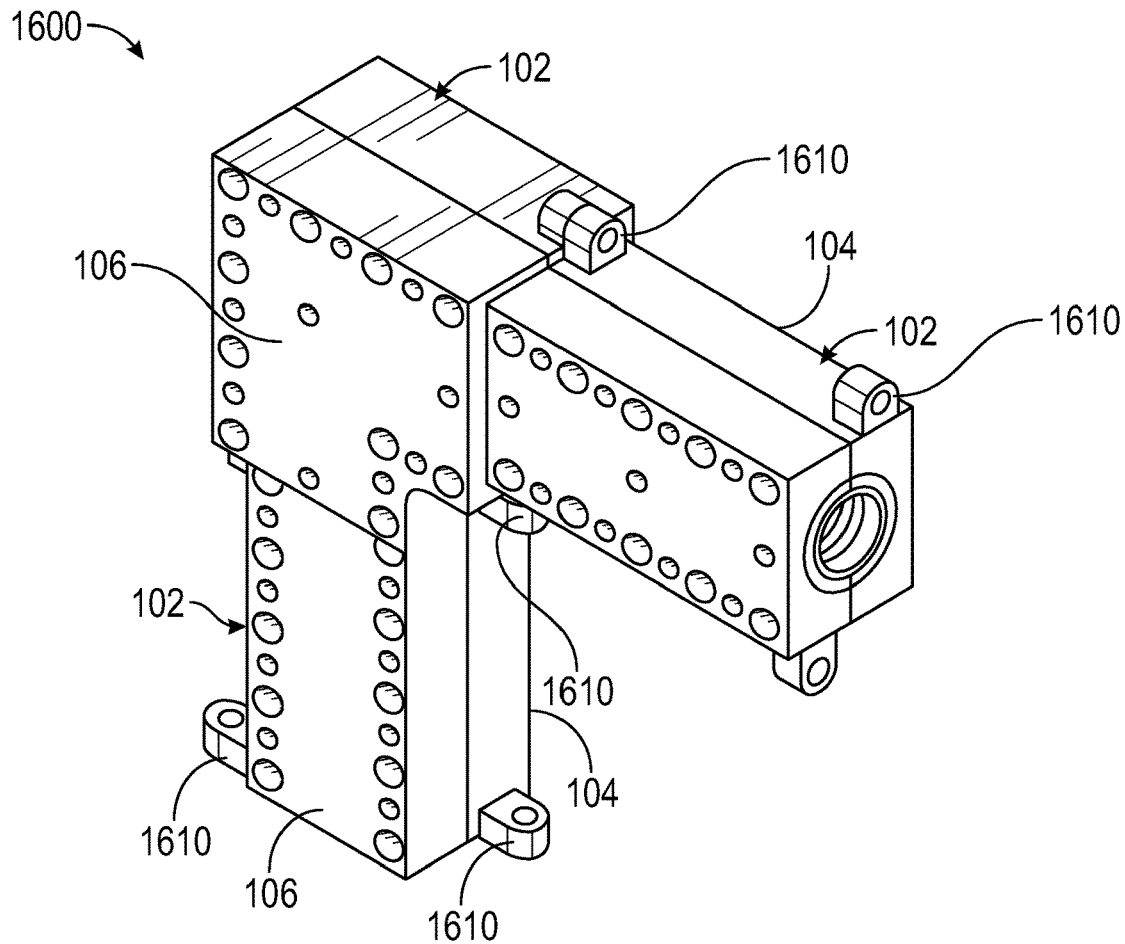
FIG. 16 is a perspective view of a modular enclosure system having a plurality of enclosures connected to one another in accordance with embodiments of the present disclosure.

Referring to FIG. 16, another embodiment of a modular enclosure system is shown and is labeled as reference number 1600. Like parts of the modular enclosure system of the present disclosure are labeled with like part numbers. Modular enclosure system 1600 includes a plurality of connected enclosures 102 with three enclosures 102 shown in the embodiment depicted in FIG. 1. Modular enclosure system 1600 may have a single enclosure 102 in some embodiments and two or more enclosures 102 in other embodiments. Each enclosure 102 includes a first enclosure portion that may be formed by a first enclosure half 104 and a second enclosure portion that may be formed by a second enclosure half 106. Second enclosure half 106 may have an identical construction as the first half enclosure 104 and is placed over the first enclosure half 104 around a pipe (not shown) to form an enclosure 102.

Enclosures 102 are coupled together to form the modular enclosure system 1600.

Strongback couplers 1610 may be used to connect one enclosure 102 to another enclosure 102 in the side-by-side configuration shown in FIG. 16. A rod (not shown) may extend between strongback couplers 1610 and may extend axially along two, three, or additional enclosures 102. Other types of coupling assemblies may be used to connect enclosures 102 with one another in the side-by-side configuration.

Figure 17A:
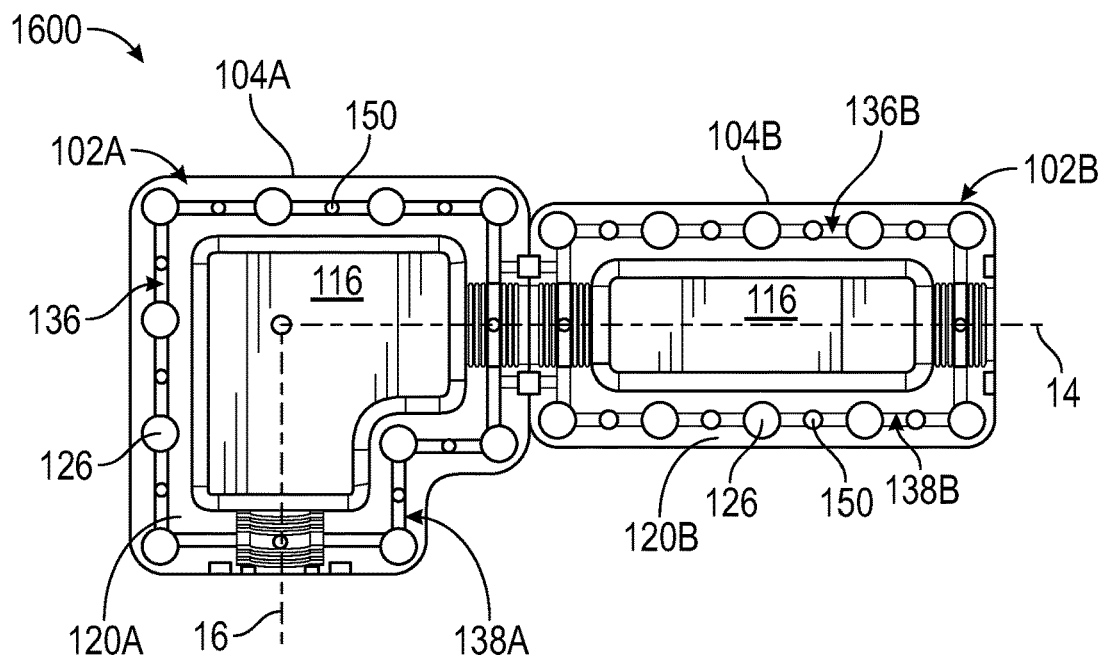
FIG. 17A is a side view of two enclosure halves connected in the side-by-side configuration of the modular enclosure system of FIG. 16 in accordance with embodiments of the present disclosure.
Figure 17B:
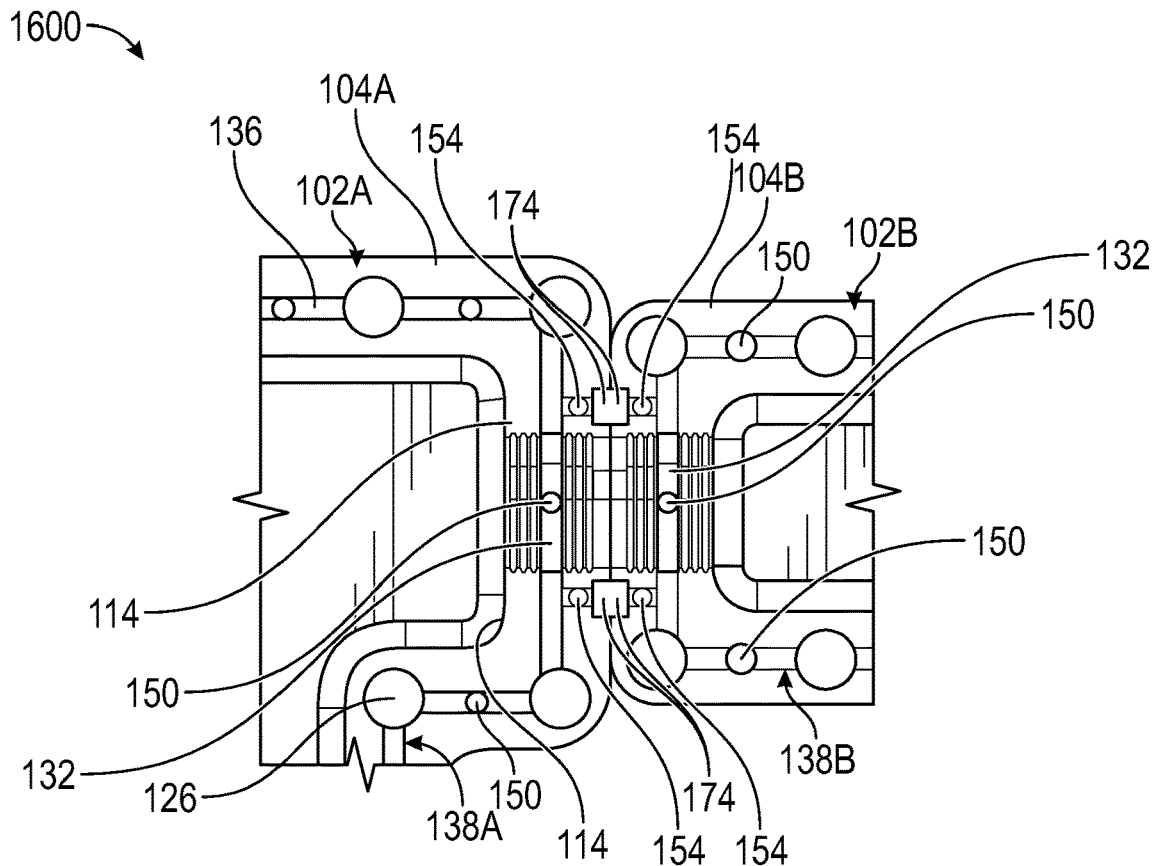
FIG. 17B is side view of a section of the modular enclosure system of FIG. 17A showing the connection of the enclosure halves in the side-by-side configuration.
Figure 17C:
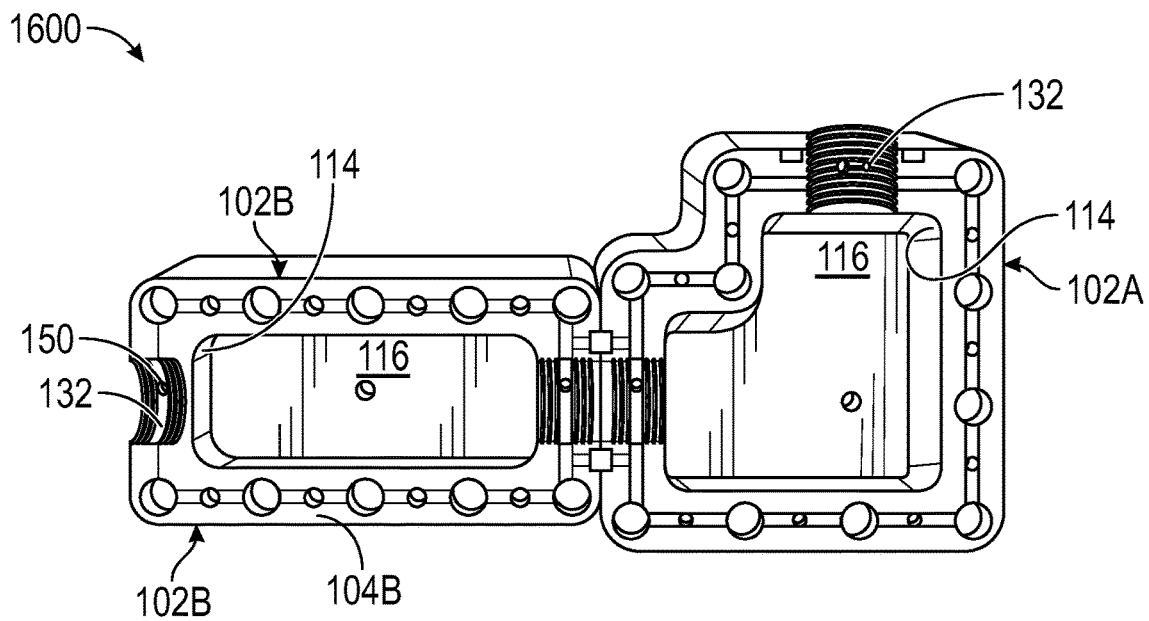
FIG. 17C is a perspective view of the modular enclosure system of FIG. 17A.

Referring to FIG. 17A-17C, a left enclosure half 104A of a first enclosure 102A and a right enclosure half 104B of a second enclosure 102B connected in the side-by-side configuration is shown. Enclosures 102A, 102B may be connected with a strongback coupler 1610, not shown. FIG. 17A shows two enclosure halves 104A, 104B shown in the modular enclosure system 1600 shown in FIG. 16 with the enclosure halves 106, shown in FIG. 16, removed.

Sealant grooves 136A, 136B of the enclosure halves 104A, 104B continuously extend along the respective enclosure faces 120A, 120B of the enclosure halves 104A, 104B on a first side of the first axis 14 and the second axis 16. Sealant grooves 138A, 138B of the enclosure halves 104A, 104B continuously extend along the respective enclosure faces 120A, 120B of the enclosure halves 104A, 104B on a second side of the first axis 14 and the second axis 16. Sealant grooves 136A, 136B connect through the connected hub faces through a first outer hub groove 174. Sealant grooves 138A, 138B connect through the connected hub faces through the first outer hub groove 174.

Injection ports may extend from an outer surface of the enclosure halves 104A, 104B to the sealant grooves 136, 138. Attachment holes 126 may extend from an outer surface of the enclosure halves 104A, 104B to the sealant grooves 136, 138. Bolts may extend through the enclosure halves 104A, 104B and connect to opposing enclosure halves to create enclosures 102A, 102B. Blocking members 154, shown in FIG. 17B, may be located and in the sealant grooves 136, 138 and operated as described with respect to embodiments described in the present disclosure. Sealant grooves 136, 138 are connected to a bore groove 132, shown in perspective in FIG. 17C, located in each end section 114 of the enclosures 102A, 102B. FIG. 17C shows a perspective view of the enclosure halves 104A, 104B at a different orientation.

Figure 18:
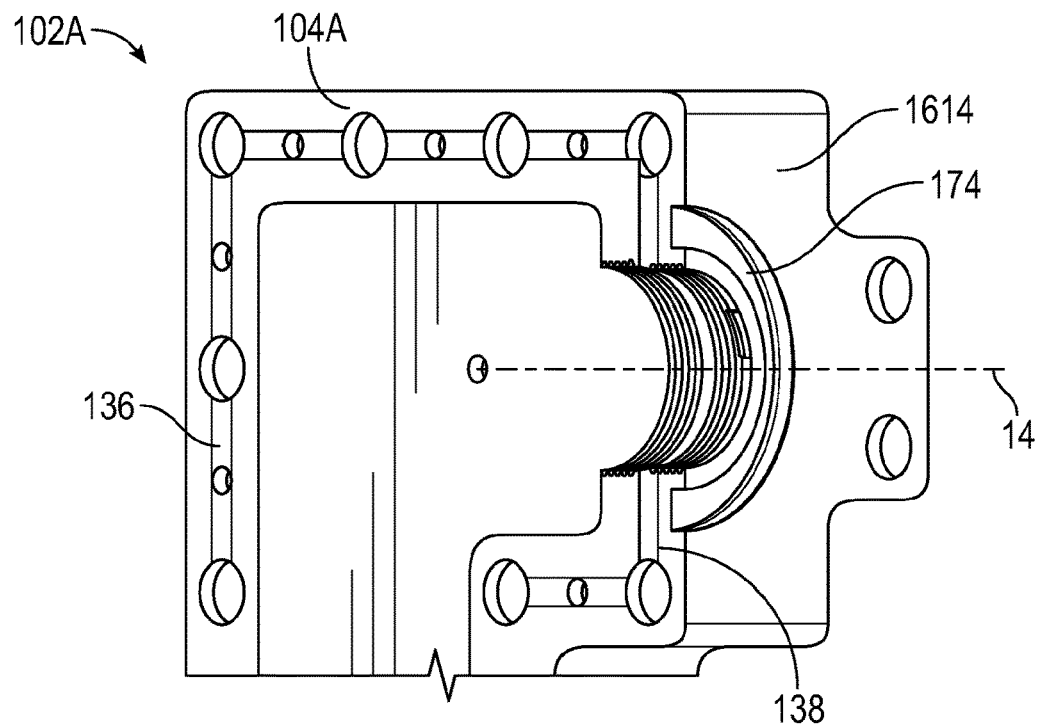
FIG. 18 is a perspective view of a portion of the enclosure half of FIG. 17A.

Referring to FIG. 18, a hub face 1614 and the first outer hub groove 174 is shown in perspective. In some embodiments, hub face 1614, labeled in FIG. 18, may be in a plane perpendicular to the first axis 14. First hub groove 174 may be formed by a channel extending axially inwards from the plane of the hub face 1614. A hub may include the hub face 1614 and the first hub groove 174.

Figure 19:
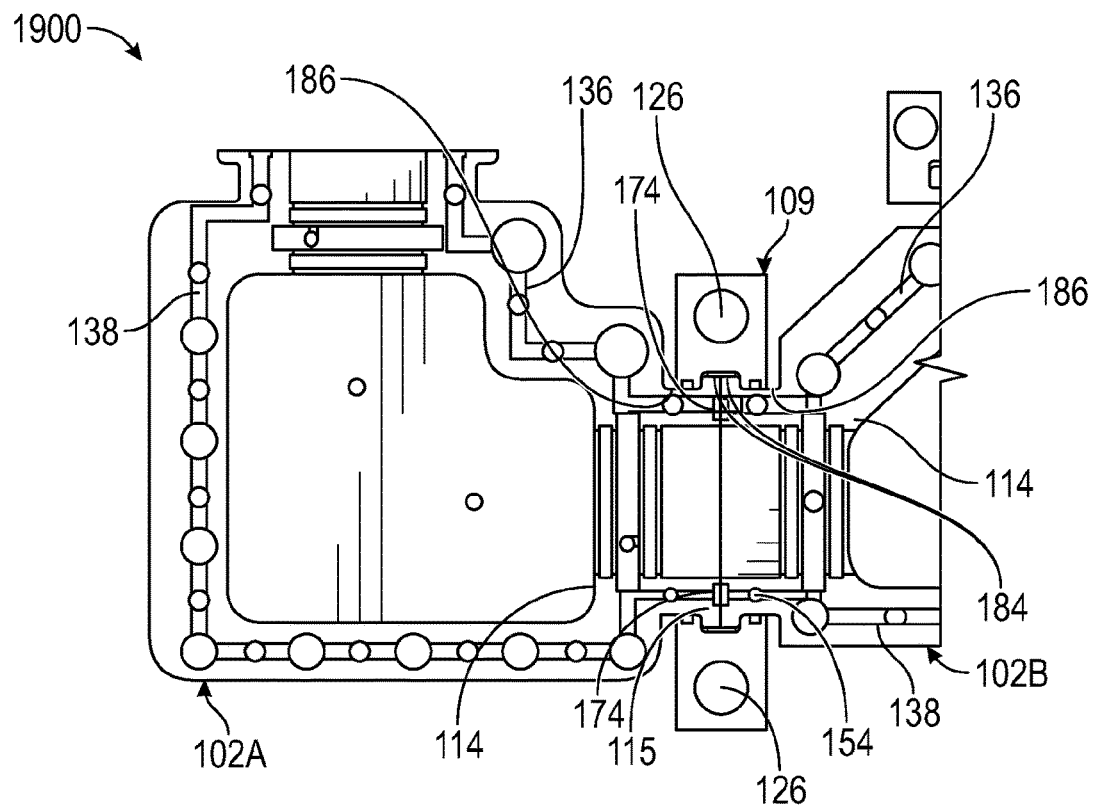
FIG. 19 is a side view of a portion of a modular enclosure system showing a coupler half connecting adjacent hubs with each hub connected to an enclosure half in the side-by-side configuration in accordance with embodiments of the present disclosure.
Figure 20:
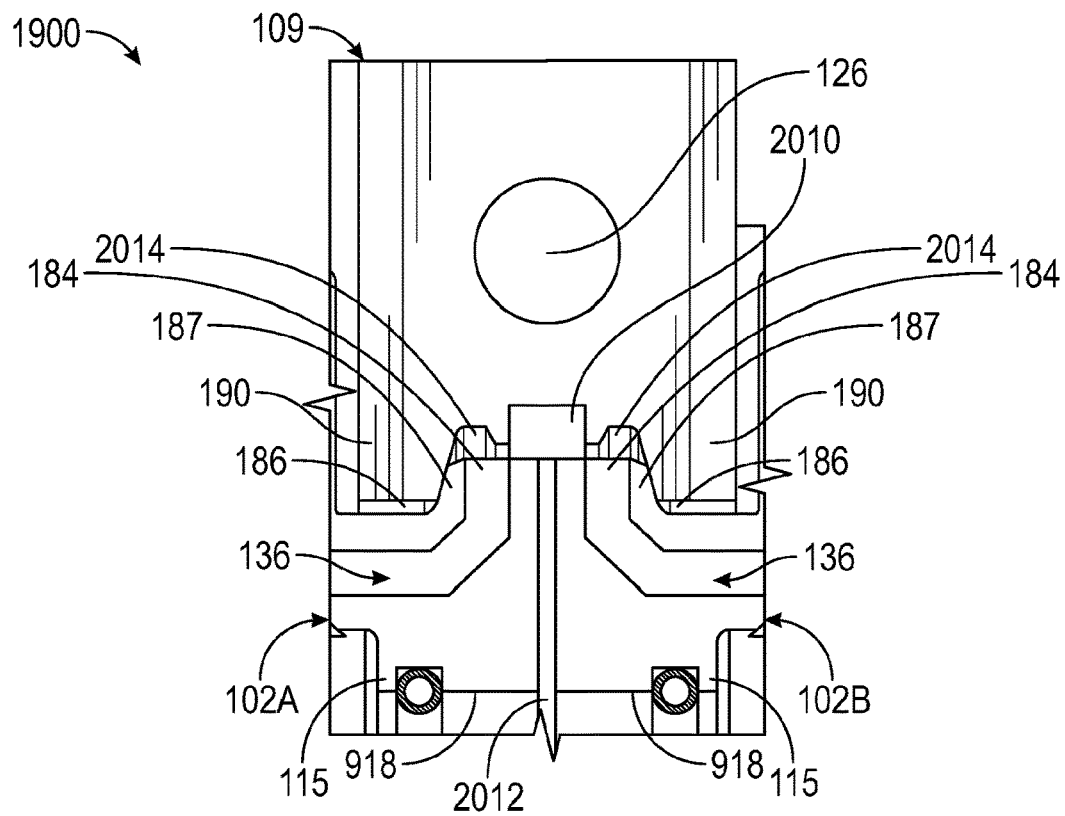
FIG. 20 is a side view of a portion of the coupling half of FIG. 19 connecting the first enclosure half to the second enclosure half in the side-by-side configuration.

Referring to FIG. 19 and FIG. 20, another embodiment of a modular enclosure system is shown and is labeled as reference number 1900. Like parts of the modular enclosure system of the present disclosure are labeled with like part numbers. First enclosure half 104 and a second enclosure half 106 are shown connected in a side-by-side configuration by a first coupling half 109 of a coupling device. Enclosure halves 102A, 102B each include an end section 114 and a hub half 115. Hub half 115 has a hub lip 184 extending radially outwards from a base surface 186 and extends 180 degrees around the hub half 115. Hub lip 184 has a shoulder wall 187 that extends from the base surface 186 at an angle so that the hub lip 184 has a wedge shape.

First enclosure half 102A and the second enclosure half 102B abut one another at hub end faces in the side-by-side configuration. Hub lips 184 of the enclosure halves 102A, 102B are adjacent one another. First outer grooves 174 of the enclosure halves 102A, 102B connect to sealant grooves 136, 138 in the enclosure halves 102A, 102B. Blocking members 154 are shown in the sealant grooves 136, 138 of the first enclosure half 104 in FIG. 19.

Figure 21:
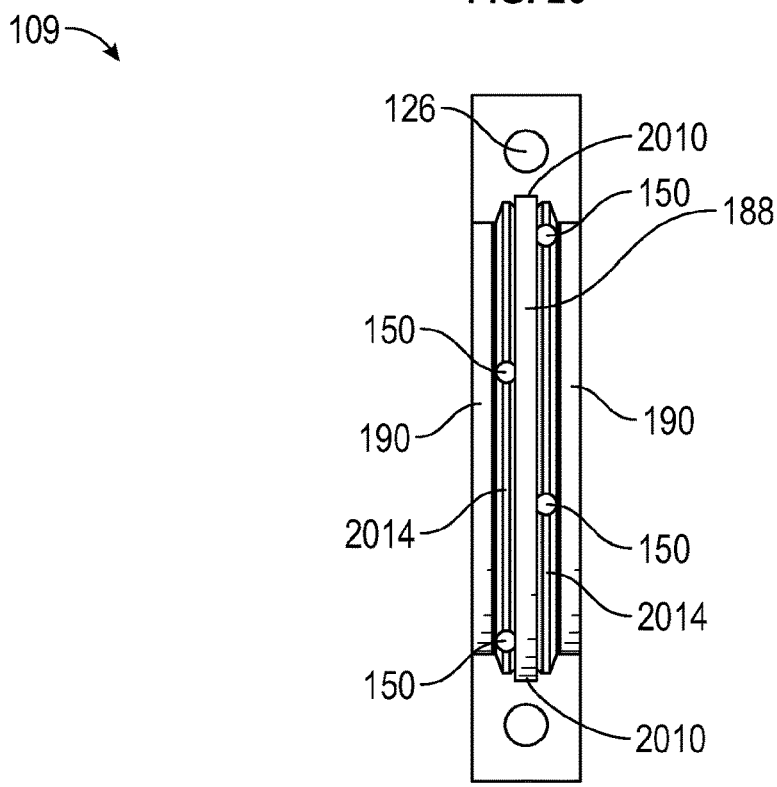
FIG. 21 is a side view of the coupling half of FIG. 19.

First coupling half 109 includes a coupler groove 188, shown in FIG. 21, that extends around the internal diameter of the first coupling half 109. The connector groove 188 is formed by a pair of external lips 190. Shoulders of the enclosure halves 102A, 102B are configured to fit between the external lips 190 of the coupler half 109, as shown in FIG. 19-20. First coupling half 109 further includes connector holes 126 for connecting the first coupling half 109 to a second coupling half, not shown, in the mated configuration. Mechanical fasteners such as bolts may be used to connect the first coupling half 109 to the second coupling half in the mated configuration.

Referring to FIG. 20, a portion of the first coupling half 109 of a coupler is shown connecting a first enclosure half 104 to a second enclosure half 106 in a side-by-side configuration. The coupler further includes a compressible seal 2010. Compressible seal 2010 may be in the form of a ring that extends around the hub lips 115 at the intersection of the hub faces. Compressible seal 2010 transverses a hub face split-line 2012 between connected hubs 115. Hub face split-line 2012 is where the hub faces of the hubs 115 face one another. Compressible seal 2010 is mounted within a seal slot in the first coupling half 109. First coupling half 109 further includes coupler sealant grooves 2014 that extend in the coupler groove 188 on opposite sides of the compressible seal 2010. Sealant may be injected in the coupler sealant grooves 2014 to provide sealant around the perimeter of the hubs 115 at the hub faces forming the hub face split-line 2012. Coupler sealant grooves 2014 may be configured to allow sealant injected into the coupler sealant groove 2014 to flow between the coupler sealant grooves 2014 and the compressible seal 2010 to compress the compressible seal 2010 towards the hub face split line 2012 formed by the hubs 115.

Figure 22:
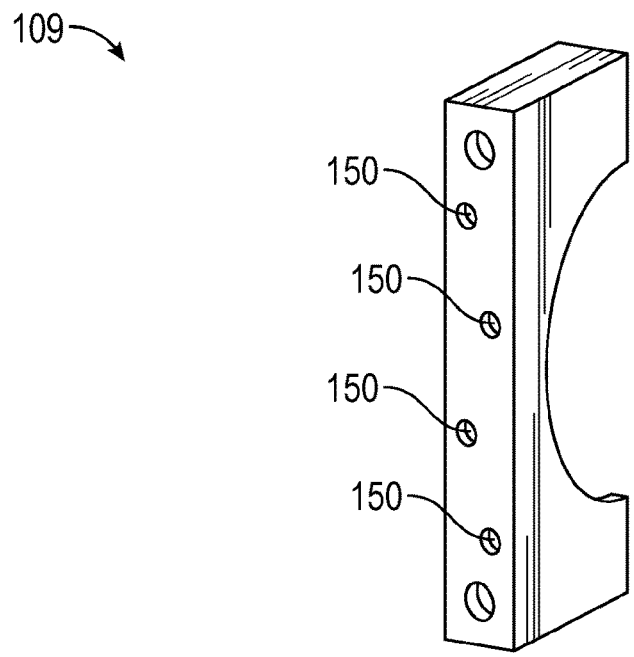
FIG. 22 is a perspective view of the coupling half of FIG. 19.

Referring to FIG. 21, a front view of the first coupling half 109 is shown. Injection ports 150 connect to the coupler sealant grooves 2014. Referring to FIG. 22, a perspective back view of the first coupling half 109 is shown. Injection ports extend form the outer surface of the first coupling half 109 to the coupler sealant grooves 2014. Coupler sealant grooves 2014 may be axially spaced on the first coupling half 109 so that the sealant grooves 2014 are disposed on opposite sides of the hub face split line 2012 when the enclosure halves 102A, 102B are disposed in the side-by-side configuration.

Figure 23:
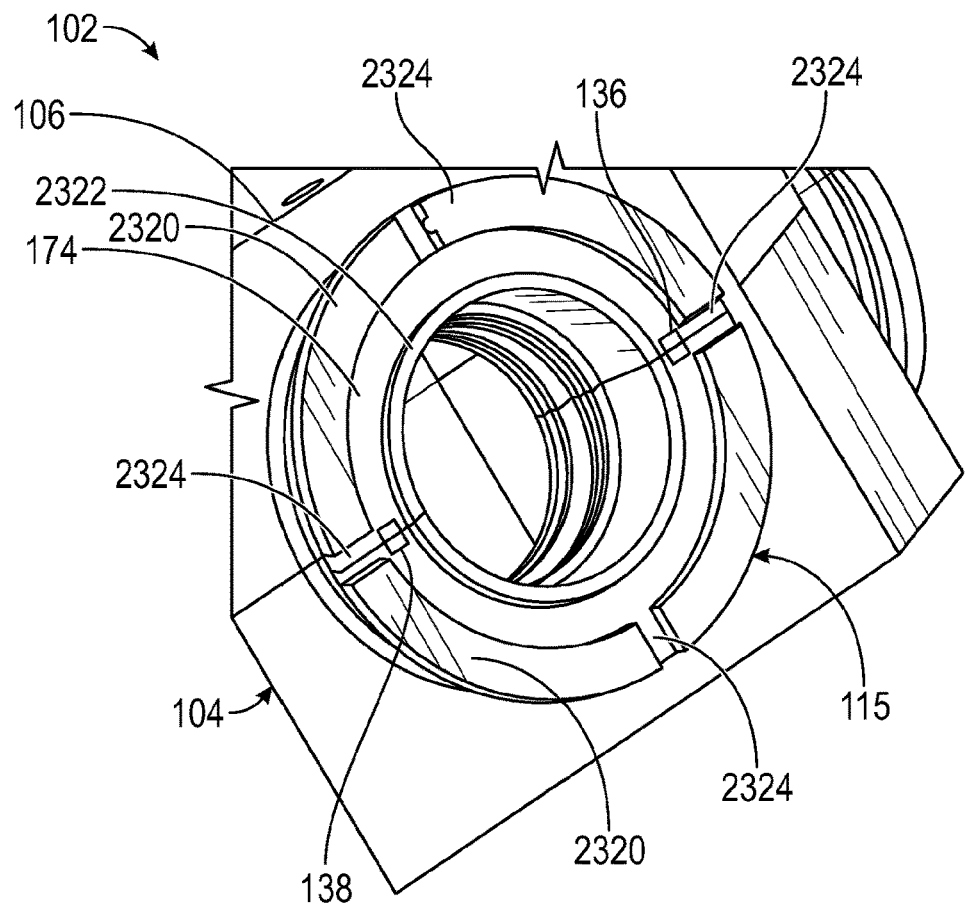
FIG. 23 is a perspective view of a portion of an enclosure created by an enclosure half of FIG. 19 and another enclosure half in the mated configuration in accordance with embodiments of the present disclosure.

Referring to FIG. 23, an enclosure 102 having a first enclosure half 104 connected to a second enclosure half 106 is shown. A hub end face includes a first outer hub groove 174, an outer hub ring 2320, an inner hub ring 2322, and hub channels 2324. First outer hub groove 174 may be disposed between the outer hub ring 2320 and the inner hub ring 2322 and forms a channel between the outer hub ring 2320 and the inner hub ring 2322. Outer hub ring 2320 and the inner hub ring 2322 may have a circular, rectangular or other shape extending around the pipe opening to the enclosure 102. Outer hub ring 2320, the inner hub ring 2322, and the first outer hub groove 174 extend around the pipe opening of the hub 115. Outer hub ring 2320 may have a plurality of hub channels 2324 passing through the outer hub ring 2320. Four hub channels 2324 are shown in FIG. 23. Sealant may be injected through the hub channels 2324 to allow for sealant to travel in the first outer hub groove 174. For example, sealant may be injected through the hub channels 2324 by injecting sealant via the coupler sealant grooves 2014, shown in FIG. 21.

Figure 24:
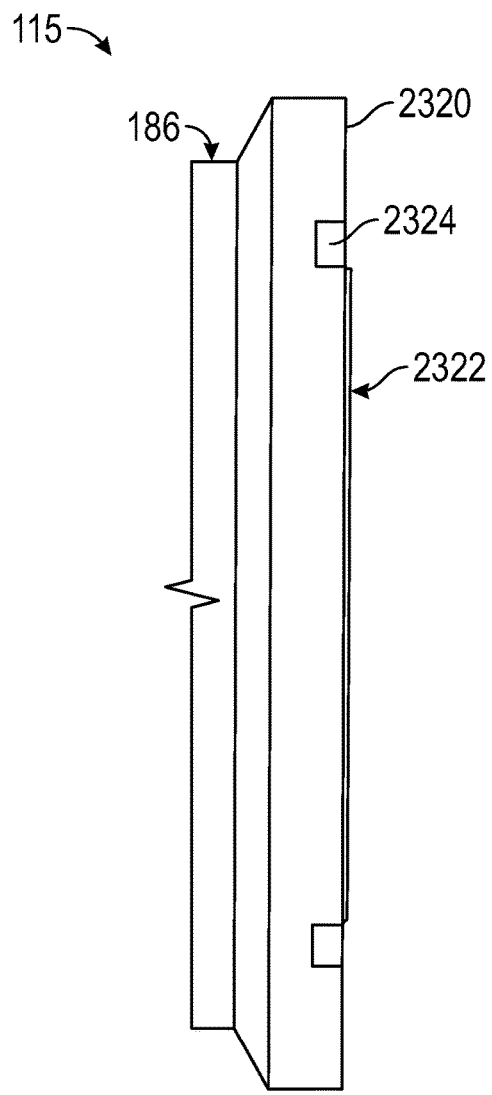
FIG. 24 is a side view of a hub half of the enclosure half of FIG. 23.

Referring to FIG. 24, a side view of a hub 115 is shown. Hub 115 includes a raised face section formed by the inner hub ring 2322 shown in FIG. 23. Inner hub ring 2322 helps hubs connected in the side-by-side configuration to achieve axial compression for a better seal at the connection between two enclosures. Hub channels 2324 may extend through the outer hub ring 2320 and lead to the first outer hub groove 174, as shown in FIG. 23.

Figure 25:
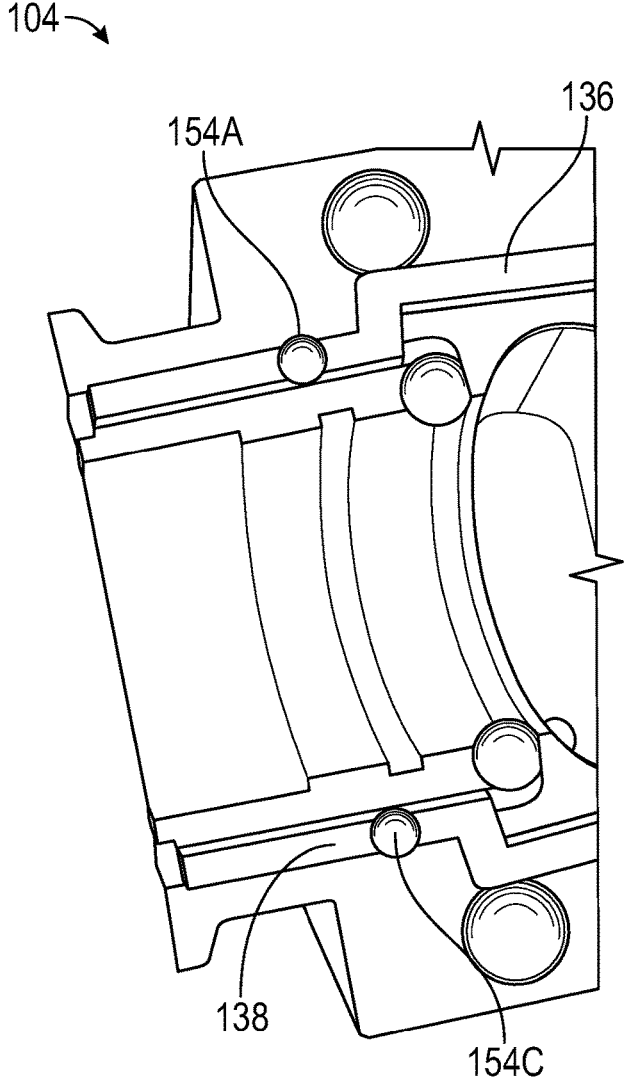
FIG. 25 is a perspective view of an enclosure half of FIG. 19.

Referring to FIG. 25, a section of a first enclosure half 104 according to an embodiment of the modular enclosure system 1900 shown in FIG. 19. First enclosure half 104 includes a first sealant control device in the form of a first blocking member 154A and a third sealant control device in the form of a third blocking member 154C. Other blocking members, not shown, are disposed adjacent another opposite end, not shown, of the first half enclosure 104. First blocking member 154A and the third blocking member 154C are disposed on axially opposite sides of the hub 115. First blocking member 154A is disposed in the first sealant groove 136 and the third blocking member 154C is disposed in the second sealant groove 138.

Figure 26:
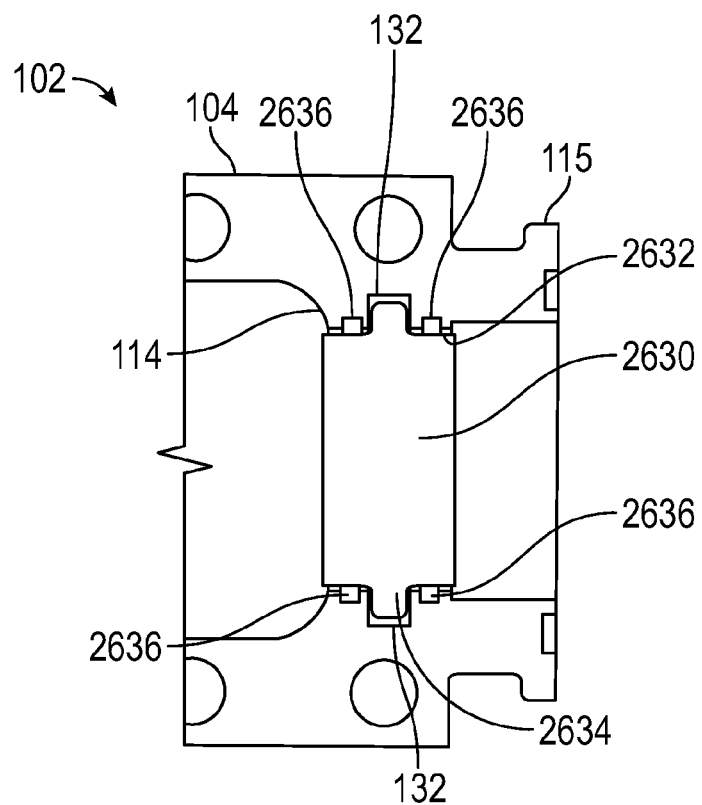
FIG. 26 is a side view of an enclosure half of FIG. 19 showing a bore insert in accordance with embodiments of the present disclosure.

Referring to FIG. 26, a portion of a first enclosure half 104 of an enclosure 102. First enclosure half 104 has a bore insert 2630 installed in the enclosure opening in one of the opposing end sections 114 to seal the end section 114 and block fluid leaks from the void section 112. Bore insert 2630 may be disc-shaped and fit in the enclosure opening. Bore insert 2630 has an insert outer surface 2632 and an insert ring 2634 extending radially outwards the insert outer surface 2632. Insert ring 2634 extends into the bore groove 132 of the end section 114. Insert ring 2634 may extend 360 degrees around the insert outer surface 2632. In some embodiments, bore seal rings 2636 may be disposed between the bore insert 2630 and an internal diameter of the opening in the end section 114, as shown in FIG. 26.

Enclosure bore insert 2630 blocks the opening in the enclosure end section 114. Bore insert 2630 may be installed to form an enclosure opening or bore that is blinded so that the bore is sealed at one end of the enclosure 102. Enclosure bore inserts 2630 may be customized to allow an enclosure bore to be blinded, customized to reduce size of the enclosure bore, or customized to allow for an angled bore in the enclosure end section 114.

Figure 27:
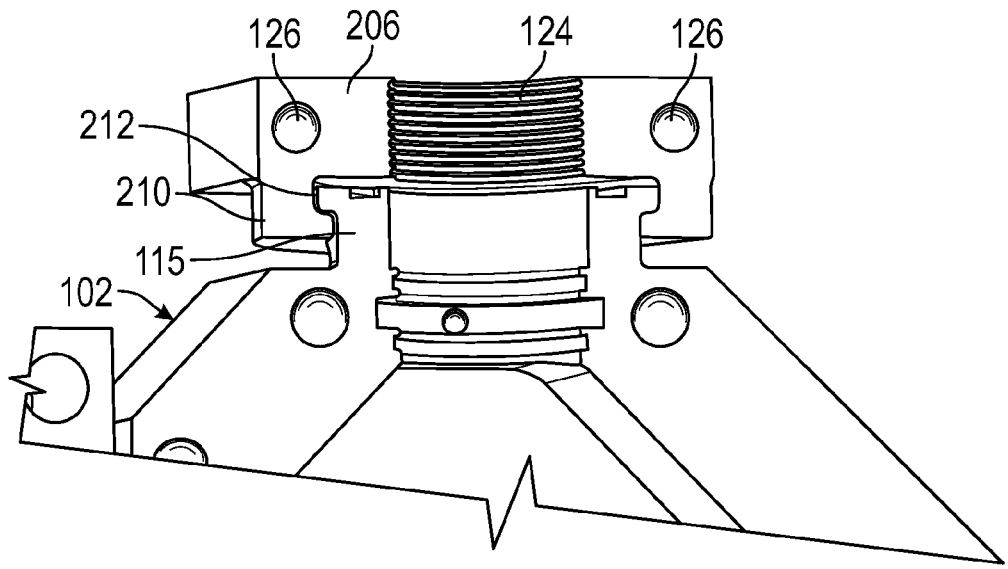
FIG. 27 is a perspective view of a strongback connector half connected to a hub half in accordance with embodiments of the present disclosure.

Referring to FIG. 27, a strongback connector half 206 is connected to a hub half 115 of an enclosure half 102 is shown. Strongback connector half 206 connects to another strongback connector, not shown, to form a strongback connector. Attachment holes 126 may be used to connect the strongback connector half 206 to another strongback connector in a mated configuration by attaching a mechanical fastener such as a bolt through the attachment holes 126. Strongback connector half 206 has a connector lip 210 that forms a connector groove 212. Connector groove 212 may form a 180 degree groove. Strongback connector is a tongue and groove style strongback connector 206. Hub half 115 includes an embodiment of a hub lip 184 that extends radial outwards and is configured to extend in the connector groove 212 to form a tongue-and-groove connection between hub half 115 and strongback connector half 206. In some embodiments, ridges 214 may be formed in the bore section of the strongback connector half 106 to help secure the strongback connector half 106 to the pipe. The bore section of the strongback connector is configured to accommodate a pipe extending through the bore section and the ridges may abut against the outer diameter of the pipe. Strongback connector half 206 and another strongback connector half are mated together and attached over a hub 115 in the mated configuration to secure the enclosure 102 to a pipe, not shown. A strongback connector helps secure an enclosure to a pipe without the use of connecting bolts (all thread/tie bars) or additional connection components.

Figure 28:
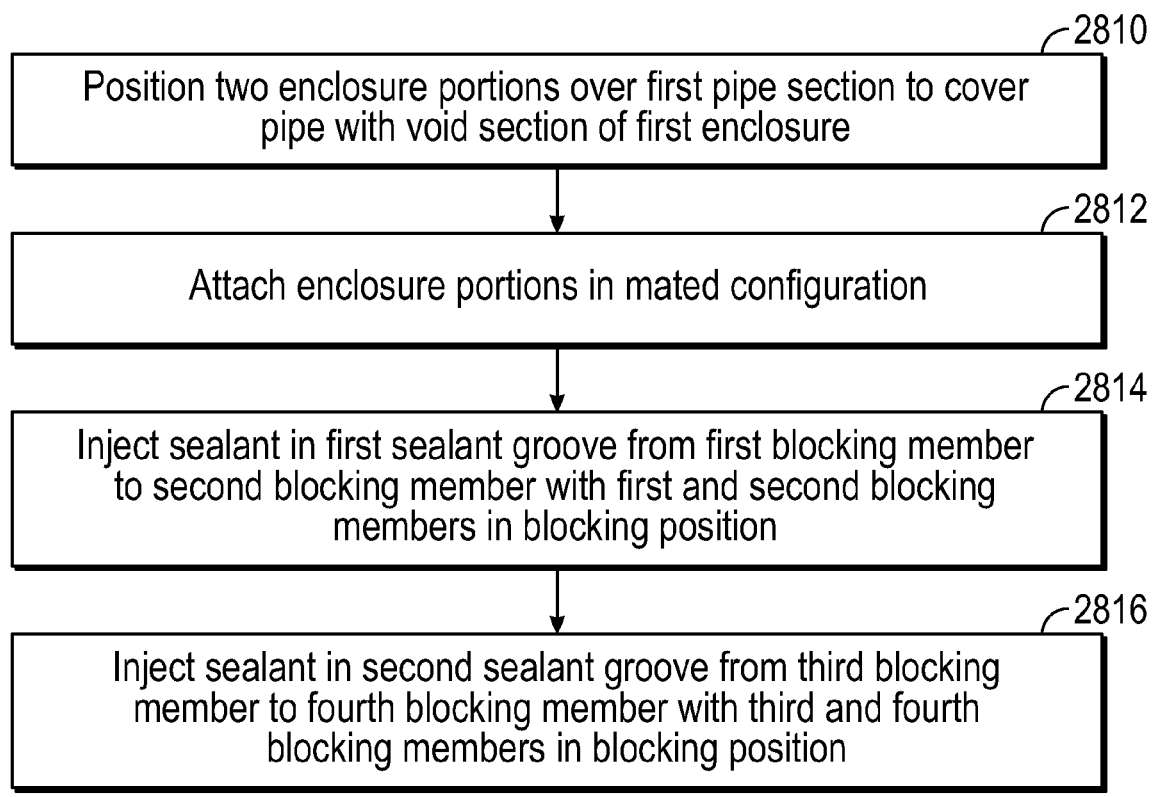
FIG. 28 is a flowchart of a method of installing a modular enclosure on a pipe in accordance with embodiments of the present disclosure.

In operation, a leak in a pipe may be repaired with a modular enclosure system of the present disclosure. Referring to the flowchart of FIG. 28, an installation of an enclosure on an enclosure on the pipe may be performed. A first enclosure portion and a second enclosure portion may be positioned around a first pipe section to cover the first pipe section with the first void section of the first enclosure (block 2810). The first enclosure half and the second enclosure half may be attached in the mated configuration (block 2812). Mechanical fasteners such as bolts may be used.

The first blocking member, the second blocking member, the third blocking member, and the fourth blocking member may be positioned in the blocking position. Sealant may be injected in the first sealant groove and the second sealant groove. Injecting sealant in the first sealant groove and the second sealant groove may further include injecting sealant in the first sealant groove from the first blocking member to the second blocking member with the first blocking member and the second blocking member in the blocking position (block 2814) and injecting sealant in the second sealant groove from the third blocking member to the fourth blocking member with the third blocking member and the fourth blocking member in the blocking position (block 2816). Referring to FIG. 14, an example of the installation of flowchart of FIG. 28 may include positioning the blocking members 154A-154D in the blocking positions and injecting sealant in the sealant grooves of the left enclosure 102A.

The injected sealant may be allowed to set to form a first injected seal in the first sealant groove between the first blocking member and the second blocking member and to form a second injected seal from the third blocking member and the fourth blocking member.

Figure 29:
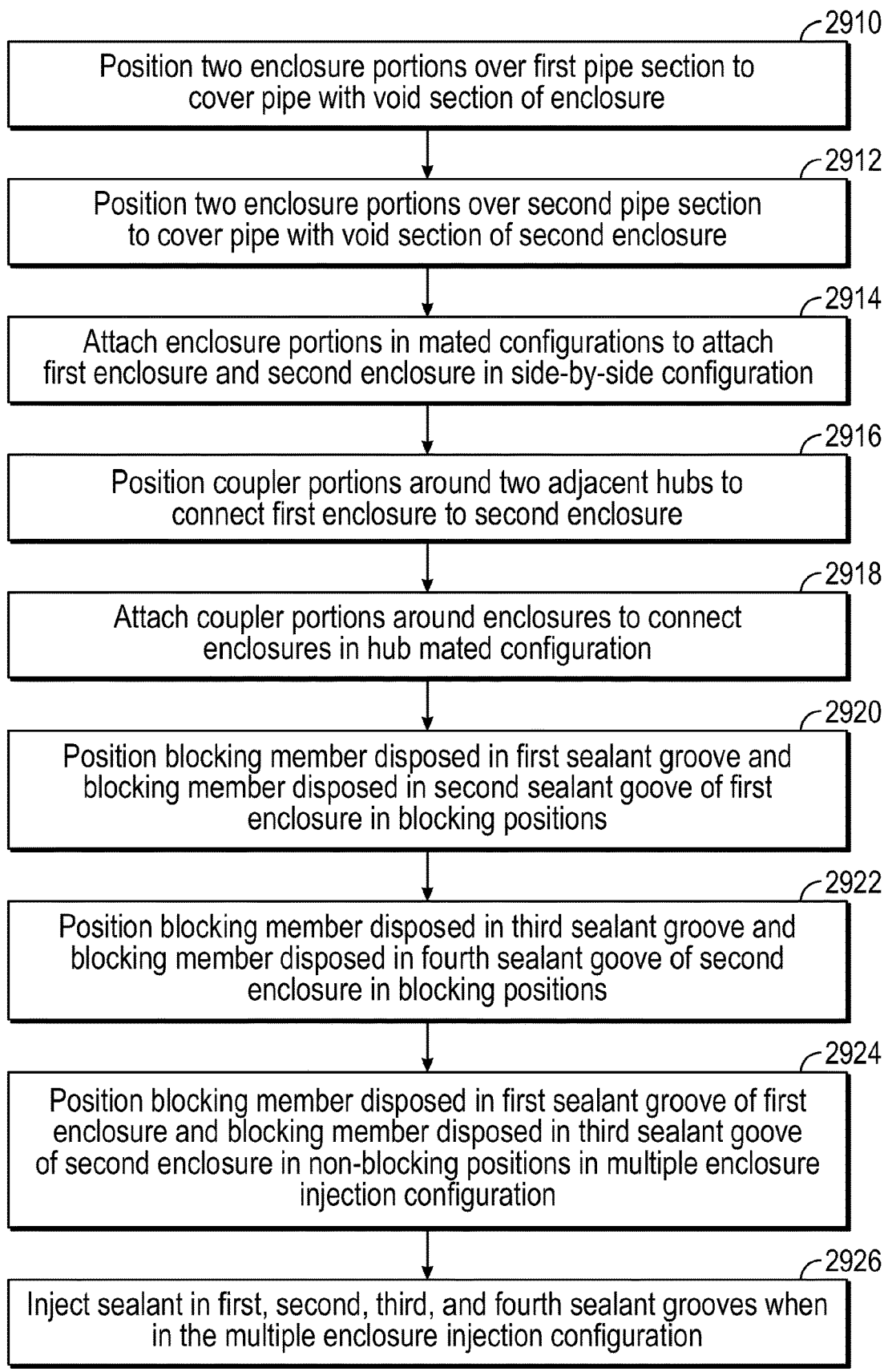
FIG. 29 is a flowchart of a method of installing multiple modular enclosures in the side-by-side configuration on a pipe in accordance with embodiments of the present disclosure.

Referring to the flowchart of FIG. 29, an alternative embodiment of installation of a first enclosure and a second enclosure in a side-by-side configuration may be performed. Two enclosure portions are positioned over a first pipe section to cover the pipe with a void section of a first enclosure (block 2910). Two enclosure portions are positioned over a second pipe section to cover the pipe with a second enclosure (block 2912). Enclosure portions are attached to create the first enclosure and the second enclosure, and the enclosures are positioned in the side-by-side configuration (block 2914). Mechanical fasteners such as bolts may be used for the attachment. A first coupler portion and a second coupler portion may be positioned around the first hub of the first enclosure and the third hub of the second enclosure to connect the first enclosure to the second enclosure (block 2916). The first coupler portion and the second coupler portion may be attached around the first hub of the first enclosure and the third hub of the second enclosure to connect the first enclosure to the second enclosure in the hub mated configuration (block 2918). Mechanical fasteners such as bolts may be used for the attachment. At least one of the plurality of blocking members of the first enclosure disposed in the first sealant groove and at least one of the plurality of blocking members of the first enclosure disposed in the second sealant groove may be positioned in the blocking position to block sealant flow between the first void section and the second hub (block 2920). At least one of the plurality of blocking members of the second enclosure disposed in the third sealant groove and at least one of the plurality of blocking members of the second enclosure disposed in the fourth sealant groove may be positioned in the blocking position to block sealant flow between the second void section and the fourth hub (block 2922). At least one of the plurality of blocking members of the first enclosure disposed in the first sealant groove and at least one of the plurality of blocking members of the second enclosure disposed in the third sealant groove may be positioned in a non-blocking position to allow sealant flow between the first void section, the coupler, and the second void section to position the modular enclosure system in a multiple enclosure injection configuration (block 2924). Sealant may be injected in the first sealant groove, the second sealant groove, the third sealant groove, and the fourth sealant groove when in the multiple enclosure injection configuration (block 2926). The injected sealant may be allowed to set to form a multiple enclosure injected seal extending along the first void section and the second void section.

Referring to FIG. 14, an example of the installation of flowchart of FIG. 29 may include for the left enclosure 102A positioning blocking members 154B, 154D in the blocking positions and blocking members 154A, 154C in the non-blocking position. For the right enclosure 102B, positioning blocking members 154F, 154H in the blocking positions and blocking members 154E, 154G positioned in the non-blocking position may be performed. Sealant may then be injected in the sealant grooves of enclosures 102A, 102B.

In some embodiments of an operation, a second enclosure may be connected to a first enclosure that has been assembled over a first pipe section in the mated configuration, injected with sealant, and the seal set to seal one or more fluid leaks in the first pipe section. After allowing the injected sealant to set in the first enclosure, the first enclosure is connected to a second enclosure in a side-by-side configuration. After allowing the injected sealant to set in the first enclosure, at least one of the blocking members in the first enclosure is positioned from the blocking position to the non-blocking position to allow sealant flow from the first sealant groove and the second sealant groove to the second enclosure. After positioning at least one of the blocking members from the blocking position to the non-blocking position in the first enclosure, sealant may be injected in at least one of the first enclosure and the second enclosure to form a continuous seal extending from the first enclosure to the second enclosure.

Connecting a plurality of enclosures allows a user to enclose one or more selected pipe sections to seal one or more fluid leaks in enclosed pipe section or pipe sections. Connecting a plurality of enclosures allows a user to select a configuration for the modular enclosure system that corresponds to the pipe section that a user selects to enclose and seal with the modular enclosure system.

The enclosures can also be customized to work with specific design parameters and geometry utilizing an automation tool. Design information may be provided to the automation tool, such as being entered into a spreadsheet, and based on that information a full design for enclosures may be produced, with minimal or no external (engineering) involvement. If customization of a modular enclosure system, including the enclosures, is required the design process may be fully automated so that a complete design may be generated by entering predetermined data into the automation tool, for example using a spreadsheet.

The present disclosure provides connection of leak repair enclosures to extend the seal boundary in order to make it possible to enclose any desired length of pipe and/or create different enclosure configurations to accommodate varying piping systems. Standard leak repair enclosures of a specific length may be connected in plurality to extend the seal boundary in order to make it possible to enclose any desired length of pipe and/or create different enclosure configurations to accommodate varying piping systems and geometry.

Blocking members of the present disclosure that may be positioned between a blocking position and a non-blocking position allow for efficient and safe sealing of the one or more enclosures on the pipe. There is a benefit in that the blocking members may be repeatedly positioned between the blocking position and the non-blocking position. This allows a user to selectively position the blocking members in different patterns to help improve the injection process. The blocking members also have the benefit of being positionable between the blocking position and the non-blocking position with a wrench or screwdriver. More complex operations such as drilling to configure the modular enclosure system for injecting sealant is minimized. For example, once a first enclosure has been sealed on a pipe section there may be a need to position selected blocking members from the blocking position to the non-blocking position. New sealant may be injected in both the second enclosure connected and in the connected first enclosure, despite the first sealant having been injected with sealant and the sealant in the first enclosure allowed to sealed, and then the new sealant allowed to set in both the first enclosure and the second enclosure. In this manner, a single continuous injected seal may extend along the first enclosure and the second enclosure to help improve sealing one or more leaks in the enclosed pipe.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded. In the claims, means-plus-function clauses are intended to cover the structures described herein as performing the recited function and not only structural equivalents, but also equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A modular enclosure system for repair of one or more leaks in a pipe, comprising:
a first enclosure portion and a second enclosure portion configured to be disposed in a mated configuration to create a first enclosure around the pipe, the first enclosure including:
a first void section configured to enclose a first pipe section of the pipe;
a first end section with a first opening configured to accommodate the enclosed pipe and a second end section with a second opening configured to accommodate the pipe, wherein the first end section includes a first bore groove and the second end section includes a second bore groove;
a first hub connected to the first end section and a second hub connected to the second end section, wherein the first hub has a first hub end face and the second hub has a second hub end face,
a first sealant groove extending along the void section and a second sealant groove extending along the void section, the first sealant groove and the second sealant groove configured to extend along opposite sides of the enclosed pipe and wherein,
the first sealant groove and the second sealant groove each extends from the first hub end face to the second hub end face; and
the first bore groove and the second bore groove are each connected to the first sealant groove and the second sealant groove; and
a first sealant control system having a plurality of blocking members and configured to selectively block sealant injected in the first enclosure to the first sealant groove and the second sealant groove, each of the plurality of blocking members in the first sealant control system positionable between a blocking position configured to block sealant flow in at least one of the first sealant groove and the second sealant groove and a non-blocking position configured to allow sealant flow in at least one of the first sealant groove and the second sealant groove, wherein
the plurality of blocking members includes:
a first blocking member and a second blocking member, the first blocking member positionable in the blocking position to block sealant flow in the first sealant groove at a first blocking location and the second blocking member positionable in the blocking position to block sealant flow in the first sealant groove at a second blocking location; and
a third blocking member and a fourth blocking member, the third blocking member positionable in the blocking position to block sealant flow in the second sealant groove at a third blocking location and the fourth blocking member positionable in the blocking position to block sealant flow in the second sealant groove at a fourth blocking location; and the first blocking member and the third blocking member in the blocking position are configured to block sealant flow between the first bore groove and the first hub end face, and wherein the second blocking member and the fourth blocking member in the blocking position are configured to block sealant flow between the second bore groove and the second hub end face.

2. The modular enclosure system of claim 1, wherein the first blocking member in the blocking position is inserted in the first sealant groove at the first blocking location and is configured to block sealant flow between the first hub and the void section, and wherein the second blocking member in the blocking position is inserted in the first sealant groove at the second blocking location and is configured to block sealant flow between the second hub and the void section.

3. The modular enclosure system of claim 1, wherein the first blocking member, the second blocking member, the third blocking member, and the fourth blocking member in the blocking position each extend through an adjustment hole section extending from an outer surface of the first enclosure portion and through a receiving hole section in the second enclosure portion to block injected sealant flow in one of the first sealant groove and the second sealant groove.

4. The modular enclosure system of claim 1, wherein the first blocking member and the third blocking member in the blocking position are configured to block sealant flow in the first sealant groove and the second sealant groove between the void section and the first hub end face, and wherein the second blocking member and the fourth blocking member in the blocking position are configured to block sealant flow in the first sealant groove and the second sealant groove between the void section and the second hub end face.

5. The modular enclosure system of claim 4, wherein the first hub end face has a first outer hub groove and the second hub end face has a second outer hub groove, and wherein the first sealant groove and the second sealant groove extend between the first outer hub groove and the second outer hub groove.

6. The modular system of claim 1, wherein the first enclosure portion and the second enclosure portion each have a first enclosure face configured to mate with one another in the mated configuration and the first enclosure portion and the second enclosure portion each have a second enclosure face configured to mate with one another in the mated configuration, and wherein the first sealant groove extends between the first enclosure face of the first enclosure portion and the first enclosure face of the second enclosure portion and the second sealant groove extends between the second enclosure face of the first enclosure portion and the second enclosure face of the second enclosure portion and configured to create an injectable seal between the first enclosure portion and the second enclosure portion.

7. The modular enclosure system of claim 1, further comprising:
a plurality of attachment devices configured to connect the first enclosure portion to the second enclosure portion.

8. The modular enclosure system of claim 1, further comprising:
a third enclosure portion and a fourth enclosure portion configured to be disposed in the mated configuration to create a second enclosure around the pipe with the first enclosure and the second enclosure adjacent one another in a side-by-side configuration, the second enclosure including:

a second void section configured to enclose a second pipe section of the pipe adjacent to the first pipe section;
a third end section with a third opening configured to accommodate the enclosed pipe and a fourth end section with a fourth opening configured to accommodate the pipe;
a third hub connected to the third end section and a fourth hub connected to the fourth end section,
a third sealant groove extending along the second void section and a fourth sealant groove extending along the second void section, the third sealant groove and the fourth sealant groove configured to extend along opposite sides of the enclosed pipe and wherein the third sealant groove of the second enclosure is connected to the first sealant of the first enclosure and the fourth sealant groove of the second enclosure is connected to the second sealant groove of the first enclosure;
a second sealant control system having a plurality of blocking members and configured to selectively block sealant injected in the second enclosure to the third sealant groove and the fourth sealant groove, each of the plurality of blocking members in the second sealant control system positionable between the blocking position configured to block sealant flow in at least one of the third sealant groove and the fourth sealant groove and a non-blocking position configured to allow sealant flow in at least one of the third sealant groove and the fourth sealant groove; and
a first coupler portion and a second coupler portion configured to be disposed in a mated configuration to create a coupler around the a first coupler portion and a second coupler portion configured to be disposed in a hub mated configuration to create a coupler around the first hub of the first enclosure and the third hub of the second enclosure to connect the first enclosure to the second enclosure.

9. The modular enclosure system of claim 8, wherein the plurality of blocking members includes:
a fifth blocking member and a sixth blocking member, the fifth blocking member positionable in the blocking position to block sealant flow in the third sealant groove at a fifth blocking location and the sixth blocking member positionable in the blocking position to block sealant flow in the third sealant groove at a sixth blocking location; and
a seventh blocking member and an eighth blocking member, the seventh blocking member positionable in the blocking position to block sealant flow in the fourth sealant groove at a seventh blocking location and the eighth blocking member positionable in the blocking position to block sealant flow in the fourth sealant groove at an eighth blocking location.

10. A method for repairing one or more leaks in a pipe, using a modular enclosure system for repair of one or more leaks in a pipe, the modular enclosure system including:
a first enclosure portion and a second enclosure portion configured to be disposed in a mated configuration to create a first enclosure around the pipe, the first enclosure including:
a first void section configured to enclose a first pipe section of the pipe;
a first end section with a first opening configured to accommodate the enclosed pipe and a second end section with a second opening configured to accommodate the pipe, wherein the first end section includes a first bore groove and the second end section includes a second bore groove;

a first hub connected to the first end section and a second hub connected to the second end section, wherein the first hub has a first hub end face and the second hub has a second hub end face;

a first sealant groove extending along the void section and a second sealant groove extending along the void section, the first sealant groove and the second sealant groove configured to extend along opposite sides of the enclosed pipe, and wherein:
   the first sealant groove and the second sealant groove each extends from the first hub end face to the second hub end face; and
   the first bore groove and the second bore groove are each connected to the first sealant groove and the second sealant groove; and a first sealant control system having a plurality of blocking members and configured to selectively block sealant injected in the first enclosure to the first sealant groove and the second sealant groove, each of the plurality of blocking members in the first sealant control system positionable between a blocking position configured to block sealant flow in at least one of the first sealant groove and the second sealant groove and a non-blocking position configured to allow sealant flow in at least one of the first sealant groove and the second sealant groove, wherein:
   the plurality of blocking members includes:
      a first blocking member and a second blocking member, the first blocking member positionable in the blocking position to block sealant flow in the first sealant groove at a first blocking location and the second blocking member positionable in the blocking position to block sealant flow in the first sealant groove at a second blocking location; and
      a third blocking member and a fourth blocking member, the third blocking member positionable in the blocking position to block sealant flow in the second sealant groove at a third blocking location and the fourth blocking member positionable in the blocking position to block sealant flow in the second sealant groove at a fourth blocking location; and
   the first blocking member and the third blocking member in the blocking position are configured to block sealant flow between the first bore groove and the first hub end face, and wherein the second blocking member and the fourth blocking member in the blocking position are configured to block sealant flow between the second bore groove and the second hub end face; and the method comprising:
   positioning the first enclosure portion and the second enclosure portion around the first pipe section to cover the first pipe section with the first void section of the first enclosure;
   attaching the first enclosure half and the second enclosure half in the mated configuration;
   positioning the first blocking member, the second blocking member, the third blocking member, and the fourth blocking member in the blocking position; and
   injecting sealant in the first sealant groove and the second sealant groove.

11. The method of claim 10, wherein the injecting sealant in the first sealant groove and the second sealant groove further includes:
   injecting sealant in the first sealant groove from the first blocking member to the second blocking member with the first blocking member and the second blocking member in the blocking position; and
   injecting sealant in the second sealant groove from the third blocking member to the fourth blocking member with the first blocking member and the second blocking member in the blocking position.

12. The method of claim 11, wherein the method further comprises:
   allowing the injected sealant to set to form a first injected seal in the first sealant groove between the first blocking member and the second blocking member and to form a second injected seal from the third blocking member and the fourth blocking member.

13. The method of claim 12, wherein the method further comprises:
   after allowing the injected sealant to set in the first enclosure, connecting the first enclosure to a second enclosure in a side-by-side configuration;
   after allowing the injected sealant to set in the first enclosure, positioning at least one of the blocking members in the first enclosure from the blocking position to the non-blocking position to allow sealant flow from the first sealant groove and the second sealant groove to the second enclosure; and
   after positioning at least one of the blocking members from the blocking position to the non-blocking position in the first enclosure, injecting sealant in at least one of the first enclosure and the second enclosure to form a continuous seal extending from the first enclosure to the second enclosure.

14. The method of claim 10, wherein the plurality of sealant blocking members further includes:
   a third enclosure portion and a fourth enclosure portion configured to be disposed in the mated configuration to create a second enclosure around the pipe with the first enclosure and the second enclosure adjacent one another in a side-by-side configuration, the second enclosure including:
      a second void section configured to enclose a second pipe section of the pipe adjacent to the first pipe section;
      a third end section with a third opening configured to accommodate the enclosed pipe and a fourth end section with a fourth opening configured to accommodate the pipe;
      a third hub connected to the third end section and a fourth hub connected to the fourth end section,
      a third sealant groove extending along the second void section and a fourth sealant groove extending along the second void section, the third sealant groove and the fourth sealant groove configured to extend along opposite sides of the enclosed pipe and wherein the third sealant groove of the second enclosure is connected to the first sealant of the first enclosure and the fourth sealant groove of the second enclosure is connected to the second sealant groove of the first enclosure;
   a second sealant control system having a second plurality of blocking members and configured to selectively block sealant injected in the second enclosure to the third sealant groove and the fourth sealant groove, each of the second plurality of blocking members in the second sealant control system positionable between the blocking position configured to block sealant flow in at least one of the third sealant groove and the fourth sealant groove and a non-blocking position configured to allow sealant flow in at least one of the third sealant groove and the fourth sealant groove; and a first coupler portion and a second coupler portion configured to be disposed in a mated configuration to create a coupler around the a first coupler portion and a second coupler portion configured to be disposed in a hub mated configuration to create a coupler around the first hub of the first enclosure and the third hub of the second enclosure to connect the first enclosure to the second enclosure; and the method further comprising:

positioning the third enclosure portion and the fourth enclosure portion around the second pipe section to cover the second pipe section with the second void section of the second enclosure in the side-by-side configuration;

attaching the third enclosure portion and the fourth enclosure portion in the mated configuration;

positioning the first coupler portion and the second coupler portion around the first hub of the first enclosure and the third hub of the second enclosure to connect the first enclosure to the second enclosure;

attaching the first coupler portion and the second coupler portion around the first hub of the first enclosure and the third hub of the second enclosure to connect the first enclosure to the second enclosure in the hub mated configuration;

positioning in the blocking position at least one of the plurality of blocking members of the first enclosure disposed in the first sealant groove and at least one of the plurality of blocking members of the first enclosure disposed in the second sealant groove to block sealant flow between the first void section and the second hub;

positioning in the blocking position at least one of the second plurality of blocking members of the second enclosure disposed in the third sealant groove and at least one of the second plurality of blocking members of the second enclosure disposed in the fourth sealant groove to block sealant flow between the second void section and the fourth hub;

positioning in the non-blocking position at least one of the plurality of blocking members of the first enclosure disposed in the first sealant groove and at least one of the second plurality of blocking members of the second enclosure disposed in the third sealant groove to allow sealant flow between the first void section, the coupler, and the second void section to position the modular enclosure system in a multiple enclosure injection configuration; and injecting sealant in the first sealant groove, the second sealant groove, the third sealant groove, and the fourth sealant groove when in the multiple enclosure injection configuration.

15. The method of claim 14, wherein the method further comprises:

allowing the injected sealant to set to form a multiple enclosure injected seal extending along the first void section and the second void section.

16. A modular enclosure system for repair of one or more leaks in a pipe, comprising:

a first enclosure portion having a first enclosure face and a second enclosure portion have a second enclosure face configured to be disposed in a mated configuration to create a first enclosure around the pipe, the first enclosure including:

a first void section configured to enclose a first pipe section of the pipe;

a first end section and a second end section, wherein the first end section includes a first bore groove and the second end section includes a second bore groove;

a first hub connected to the first end section and a second hub configured to connect the first enclosure to a second enclosure, wherein the first hub has a first hub end face and the second hub has a second hub end face;

a first sealant groove and a second sealant groove disposed between the enclosure face and the second enclosure face when in the mated configuration, and wherein:

the first sealant groove and the second sealant groove each extends from the first hub end face to the second hub end face; and the first bore groove and the second bore groove are each connected to the first sealant groove and the second sealant groove; and a first sealant control system having a plurality of blocking members and configured to selectively block sealant injected in the first enclosure to the first sealant groove and the second sealant groove, each of the plurality of blocking members in the first sealant control system positionable between a blocking position configured to block sealant flow in at least one of the first sealant groove and the second sealant groove and a non-blocking position, wherein:

the plurality of blocking members includes:

a first blocking member and a second blocking member, the first blocking member positionable in the blocking position to block sealant flow in the first sealant groove at a first blocking location and the second blocking member positionable in the blocking position to block sealant flow in the first sealant groove at a second blocking location; and a third blocking member and a fourth blocking member, the third blocking member positionable in the blocking position to block sealant flow in the second sealant groove at a third blocking location and the fourth blocking member positionable in the blocking position to block sealant flow in the second sealant groove at a fourth blocking location; and the first blocking member and the third blocking member in the blocking position are configured to block sealant flow between the first bore groove and the first hub end face, and wherein the second blocking member and the fourth blocking member in the blocking position are configured to block sealant flow between the second bore groove and the second hub end face.

* * * * *